US010077336B2

(12) United States Patent
Peretolchin et al.

(10) Patent No.: US 10,077,336 B2
(45) Date of Patent: Sep. 18, 2018

(54) FUNCTIONALIZED HIGHLY BRANCHED MELAMINE-POLYAMINE POLYMERS

(75) Inventors: Maxim Peretolchin, Mannheim (DE); Marta Reinoso Garcia, Dossenheim (DE); Holger Tuerk, Mannheim (DE); Daniel Schoenfelder, Brussels (BE); Sophia Ebert, Mannheim (DE)

(73) Assignee: BASF SE, Ludwigshafen (DE)

(*) Notice: Subject to any disclaimer, the term of this patent is extended or adjusted under 35 U.S.C. 154(b) by 0 days.

(21) Appl. No.: 13/516,426

(22) PCT Filed: Dec. 15, 2010

(86) PCT No.: PCT/EP2010/069735
§ 371 (c)(1),
(2), (4) Date: Jun. 15, 2012

(87) PCT Pub. No.: WO2011/073246
PCT Pub. Date: Jun. 23, 2011

(65) Prior Publication Data
US 2012/0252987 A1 Oct. 4, 2012

(30) Foreign Application Priority Data

Dec. 16, 2009 (EP) ..................................... 09179490

(51) Int. Cl.
C08G 73/06 (2006.01)
C08G 83/00 (2006.01)
C08G 73/02 (2006.01)
C08G 71/02 (2006.01)
C08G 73/00 (2006.01)
C07D 251/70 (2006.01)
C11D 1/90 (2006.01)
C11D 1/92 (2006.01)
C11D 3/28 (2006.01)
C08L 79/02 (2006.01)
C08L 79/04 (2006.01)
C04B 24/16 (2006.01)
C04B 24/24 (2006.01)
C04B 24/32 (2006.01)
C04B 103/40 (2006.01)

(52) U.S. Cl.
CPC ........ C08G 73/0273 (2013.01); C04B 24/166 (2013.01); C04B 24/243 (2013.01); C04B 24/32 (2013.01); C08G 73/0644 (2013.01); C08G 83/005 (2013.01); C08G 83/006 (2013.01); C08L 79/02 (2013.01); C08L 79/04 (2013.01); C11D 1/90 (2013.01); C11D 1/92 (2013.01); C11D 3/28 (2013.01); C04B 2103/408 (2013.01)

(58) Field of Classification Search
CPC ............ C08G 73/0273; C08G 73/0644; C08G 18/5072; C08G 83/005; C08G 83/006; C08L 79/02; C08L 79/04; C08L 71/02; C11D 1/90; C11D 1/92; C11D 3/28; C04B 24/166; C04B 24/243; C04B 24/32
USPC .......................................................... 544/200
See application file for complete search history.

(56) References Cited

U.S. PATENT DOCUMENTS

| 6,034,271 | A  | * | 3/2000  | Kwetkat ........................ 562/565 |
| 7,163,985 | B2 | * | 1/2007  | Ortiz et al. .................... 525/404 |
| 2005/0222360 | A1 |   | 10/2005 | Bruchmann |
| 2007/0083030 | A1 | * | 4/2007  | Bruchmann et al. ......... 528/196 |
| 2008/0306237 | A1 |   | 12/2008 | Bruchmann et al. |
| 2010/0280185 | A1 |   | 11/2010 | Peretolchin et al. |
| 2011/0028603 | A1 |   | 2/2011  | Peretolchin et al. |
| 2011/0098363 | A1 |   | 4/2011  | Garnier et al. |

FOREIGN PATENT DOCUMENTS

| RU | 2 088 645 C1 | 8/1997 |
| WO | WO 92/06151 A1 | 4/1992 |
| WO | 03 066702 | 8/2003 |
| WO | 2005 044897 | 5/2005 |
| WO | 2005 075541 | 8/2005 |
| WO | 2008 148766 | 12/2008 |

(Continued)

OTHER PUBLICATIONS

Partial machine translation of WO 2009/080787 A1.*
U.S. Appl. No. 13/580,039, filed Aug. 20, 2012, Raman, et al.
U.S. Appl. No. 13/511,700, filed May 24, 2012, Tuerk, et al.
U.S. Appl. No. 13/514,332, filed Jun. 7, 2012, Tuerk, et al.
Flory, P.J., "Molecular Size Distribution in Three Dimensional Polymers. VI. Branched Polymers Containing A-R-$B_{f-1}$ Type Units," Journal of the American Chemical Society, vol. 74, pp. 2718-2723, (1952).

(Continued)

Primary Examiner — Kregg T Brooks
(74) Attorney, Agent, or Firm — Oblon, McClelland, Maier & Neustadt, L.L.P.

(57) ABSTRACT

The present invention relates to a method for producing amphiphilic functionalized highly branched melamine-polyamine polymers by condensing melamine and optionally a melamine derivate having at least one different amine having at least two primary amino groups and optionally also with urea and/or at least one urea derivative and/or with at least one at least difunctional diisocyanate or polyisocyanate and/or at least one carbolic acid having at least two carboxyl groups or at least one derivative thereof, optionally quaternizing a portion of the amino groups of the polymer thereby obtained, reacting the polymer thus obtained with at least one compound capable of undergoing a condensation or addition reaction with amino groups, and optionally quaternizing at least part of the amino groups of the polymer obtained in the first step. The invention further relates to the amphiphilic functionalized highly branched melamine-polyamine polymers that can be obtained by the method according to the invention, and to the use thereof as surface active agents.

30 Claims, No Drawings

(56) References Cited

FOREIGN PATENT DOCUMENTS

| WO | 2009 021986 | 2/2009 | |
|---|---|---|---|
| WO | WO 2009065805 A2 * | 5/2009 | |
| WO | 2009 080787 | 7/2009 | |
| WO | WO 2009144274 A2 * | 12/2009 | ........... C07D 251/18 |

OTHER PUBLICATIONS

Sunder, A., et al., "Controlling the Growth of Polymer Trees: Concepts and Perspectives for Hyperbranched Polymers," Chem. Eur. J., vol. 6, No. 14, pp. 2499-2506, (2000).
Wicks Jr., Z.W., "Blocked Isocyanates," Progress in Organic Coatings, vol. 3, pp. 73-99, (1975).
Wicks Jr., Z.W., "New Developments in the Field of Blocked Isocyanates," Progress in Organic Coatings, vol. 9, pp. 3-28, (1981).
Wicks, D.A., et al., "Blocked isocyanates III: Part A. Mechanisms and chemistry," Progress in Organic Coatings, vol. 36, pp. 148-172, (1999).
Wicks, D.A., et al., "Blocked isocyanates III Part B: Uses and applications of blocked isocyanates," Progress in Organic Coatings, vol. 41, pp. 1-83, (2001).
Houben-Weyl, "Methoden Der Organischen Chemie," Georg Thieme Verlag, vol. XIV/2, pp. 61-70, (1963).
March, J., "Advanced Organic Chemistry Reactions, Mechanisms, and Structure," John Wiley & Sons, $3^{rd}$ Edition, pp. 370-377 and 800-803, (1985).
International Search Report dated Feb. 2, 2011 PCT/EP10/69735 Filed Dec. 15, 2010.
Notice of Allowance dated May 27, 2015 in Russian Patent Application No. 2012129681/04(046628) (with English language translation).

* cited by examiner

FUNCTIONALIZED HIGHLY BRANCHED MELAMINE-POLYAMINE POLYMERS

This application is a National Stage of PCT/EP2010/069735, which was filed on Dec. 15, 2010. This application is based upon and claims the benefit of priority to European Application No. 091794.9, which was filed on Dec. 16, 2009.

The present invention relates to a process for the preparation of amphiphilic functionalized highly branched melamine-polyamine polymers by condensation of melamine and optionally of a melamine derivative with at least one amine having at least two primary amino groups and different therefrom and optionally, moreover, also with urea and/or at least one urea derivative and/or with at least one at least difunctional di- or polyisocyanate and/or at least one carboxylic acid having at least two carboxyl groups or at least one derivative thereof, optionally quaternization of some of the amino groups in the polymer segment thereby obtained, reaction of the resulting polymer segment with at least one compound which can enter into a condensation reaction or addition reaction with amino groups, and optionally quaternization of at least some of the amino groups in the polymer segment obtained in the first step. Moreover, the invention relates to the amphiphilic functionalized highly branched melamine-polyamine polymers obtainable by the process according to the invention and to their use as surface-active agent.

Amphiphilic polymers and their use as surface-active agents, e.g. as surfactants, emulsifiers, dispersants or solubilizers, are known in principle. An important class is oligo-/polyethylene oxide- or oligo-/polypropylene oxide-modified polyethyleneimines. One disadvantage of these systems is that the polyethyleneimine (PEI) on which the polymers are based can be varied only to a very limited degree (e.g. by changing the chain length or the degree of branching), meaning that also the properties of the EO- or PO-modified polyethyleneimines, in particular their surface activity, can be changed only to a very limited extent. This naturally constitutes a not inconsiderable disadvantage for the "fine tuning" of the properties of the application product.

It was therefore an object of the present invention to provide functionalized polymers, the properties of which, in particular surface properties, can be easily changed, and also a preparation process therefor.

The object is achieved by the process described below and also by the polymers obtainable therewith.

The invention provides a process for the preparation of amphiphilic functionalized highly branched melamine-polyamine polymers, comprising the following steps:
(i) condensation of
  (i.1) melamine and optionally at least one melamine derivative with
  (i.2) at least one amine different therefrom having at least two primary amino groups;
  and optionally moreover also with
  (i.3) urea and/or at least one urea derivative; and/or
  (i.4) at least one at least difunctional di- or polyisocyanate; and/or
  (i.5) at least one carboxylic acid having at least two carboxyl groups or at least one derivative thereof;
(ii) optionally quaternization of some of the amino groups of the polymer (segment) obtained in step (i);
(iii) reacting the polymer (segment) obtained in step (i) or (ii) with at least one compound which can enter into a condensation reaction or addition reaction with amino groups and which is selected from aliphatic monocarboxylic acids or derivatives thereof, polycarboxylic acids or derivatives thereof, aliphatic, cycloaliphatic or aromatic optionally capped isocyanates, aliphatic monoamines, aliphatic polyamines, amine-terminated polyethers, alkylene oxides, aldehydes, ketones and aldehydes in combination with a CH-acidic compound or a hydroxyaromatic; and
(iv) especially if step (ii) has not been carried out, optionally quaternization of at least some of the amino groups in the polymer segment obtained in step (i).

The invention also provides polymers obtainable with the process according to the invention.

Within the context of the present invention, the term "polymer" is understood in the broad sense and comprises polymers, polyadducts and polycondensates, i.e. it does not stipulate by which route the propagation of the chain proceeds. In the present invention it is most often used to refer to polycondensates and polyadducts.

Within the context of the present invention, highly branched polymers are understood as meaning polymers with a branched structure and a high functionality, i.e. a high density of functional groups. As regards a general definition of highly branched polymers, reference is made to P. J. Flori, J. Am. Chem. Soc., 1952, 74, 2718, and H. Frey et al., Chem. Eur. J., 2000, 6, No. 14, 2499. These include star polymers, dendrimers, structurally and molecularly nonuniform highly branched polymers and high molecular weight branched polymers different therefrom, such as comb polymers. Star polymers are those polymers in which three or more chains originate from a center. The center may be an individual atom or a group of atoms. Dendrimers (cascade polymers) are molecularly uniform polymers with a highly symmetrical structure. They are derived structurally from star polymers, their chains again branching in a star-like manner. Dendrimers are prepared starting from small molecules through repeated reaction sequences. The number of monomer end groups grows exponentially with each reaction step and results in a spherical, tree-like structure. On account of their uniform structure, dendrimers have a uniform molecular weight.

Within the context of the present invention, preferably highly branched polymers are provided which are different from dendrimers, i.e. which are both structurally and also molecularly nonuniform (and therefore do not have a uniform molecular weight, but a molecular weight distribution). Depending on the reaction procedure, they can on the one hand be constructed starting from a central molecule analogously to dendrimers, but with a nonuniform chain length of the branches. On the other hand, they can also start from linear molecules and be constructed with branched functional side groups.

Within the context of the present invention, moreover, "highly branched" means that the degree of branching (DB) is 10 to 99.9%, preferably 20 to 99% and in particular from 20 to 95%. The degree of branching is understood as meaning the average number of dendritic linkages plus average number of end groups per molecule, divided by the sum of average number of dendritic linkages, the average number of linear linkages and the average number of end groups, multiplied by 100. In this connection, "dendritic" is understood as meaning that the degree of branching at this point in the molecule is 99.9 to 100%. For the definition of the degree of branching, reference is also made to H. Frey et al., Acta. Polym. 1997, 48, 30.

The highly branched polymers according to the invention are essentially not crosslinked. Within the context of the present invention, "essentially not crosslinked" or "uncrosslinked" means that a degree of crosslinking of less than 15% by weight, preferably of less than 10% by weight, is present, the degree of crosslinking being determined over the insoluble fraction of the polymer. The insoluble fraction of the polymer is determined, for example, by extraction for 4 hours with the same solvent as is used for gel permeation chromatography (GPC), i.e. preferably dimethylacetamide or hexafluoroisopropanol, depending on in which of the solvents the polymer is more soluble, in a Soxhlet apparatus and, after drying the residue to constant weight, weighing the remaining residue.

The highly branched polymers according to the invention preferably have a number-average molecular weight $M_n$ of at least 500, e.g. of from 500 to 200 000 or preferably from 500 to 100 000 or particularly preferably from 500 to 50 000 or more preferably from 500 to 30 000 or even more preferably from 500 to 20 000 or in particular from 500 to 10 000; particularly preferably of at least 750, e.g. from 750 to 200 000 or preferably from 750 to 100 000 or particularly preferably from 750 to 50 000 or more preferably from 750 to 30 000 or even more preferably from 750 to 20 000 or in particular from 750 to 10 000; and in particular of at least 1000, e.g. from 1000 to 200 000 or preferably from 1000 to 100 000 or particularly preferably from 1000 to 50 000 or more preferably from 1000 to 30 000 or even more preferably from 1000 to 20 000 or in particular from 1000 to 10 000.

Preferably, the highly branched polymers according to the invention have a weight-average molecular weight $M_w$ of at least 1000, e.g. from 1000 to 1 000 000 or preferably from 1000 to 500 000 or particularly preferably from 1000 to 300 000 and more preferably from 1000 to 200 000 or specifically from 1000 to 30 000; particularly preferably of at least 1500, e.g. from 1500 to 1 000 000 or preferably from 1500 to 500 000 or particularly preferably from 1500 to 300 000 or more preferably from 1500 to 200 000 or specifically from 1500 to 30 000; and in particular of at least 2000, e.g. from 2000 to 1 000 000 and preferably from 2000 to 500 000 or particularly preferably from 2000 to 300 000 or more preferably from 2000 to 200 000 or specifically from 2000 to 30 000.

The polydispersity (PD=$M_w/M_n$) is preferably in the range from 1.1 to 250, particularly preferably from 1.3 to 100, more preferably from 1.4 to 50 and in particular from 1.4 to 50.

The statements made within the context of the present invention regarding molecular weights ($M_n$, $M_w$) and the polydispersity refer to values which arise with gel permeation chromatography (GPC) in a suitable solvent, such as hexafluoroisopropanol, tetrahydrofuran, N,N-dimethylacetamide or water, with PMMA calibration.

The process according to the invention serves for the preparation of amphiphilic functionalized highly branched melamine-polyamine polymers. The term amphiphilic is used to refer to (monomeric or polymeric) compounds which have both hydrophilic and lipophilic properties. Within the context of the present invention, amphiphilic polymers are understood as meaning polymers which have polymer segments of different polarity, i.e. at least one (preferably one) polymer segment with hydrophilic properties and at least one (preferably one) polymer segment with lipophilic properties. Within the context of the present invention, unless stated otherwise, the terms "lipophilic" and "hydrophilic" are used as relative terms; i.e. a hydrophilic segment in the polymer according to the invention is a segment which is more polar than a lipophilic segment. In this connection, the polarity difference must of course not be marginal, but must be so great than an amphiphilic polymer is formed. The amphiphilicity must be so great here that the polymer is interface-active and can be used, for example, as surfactant or emulsifier.

The term "polymer segment" refers to a part of the polymer molecule which differs from the other polymer segment(s) of the polymer by virtue of certain properties, here by virtue of certain polymerized-monomers or more generally by a certain polarity. In the case of linear copolymers, such segments are also referred to as polymer blocks; in the case of core/shell polymers, core and shell form different polymer segments.

The process product of steps (i) and (ii) is sometimes referred to as polymer segment although it is actually a self-contained polymer. However, since this is reacted further in step (iii) and in optional step (iv) and, in the finished polymer, it only constitutes one part of it, it is already referred to in steps (i) and (ii) as "segment".

Where no other statements are made, the following general definitions apply within the context of the present invention:

$C_1$-$C_4$-Alkyl is a linear or branched alkyl radical having 1 to 4 carbon atoms. These are methyl, ethyl, n-propyl, isopropyl, n-butyl, sec-butyl, isobutyl and tert-butyl.

Linear $C_1$-$C_4$-alkyl is a linear alkyl radical having 1 to 4 carbon atoms. These are methyl, ethyl, n-propyl and n-butyl.

$C_2$-$C_6$-Alkyl is a linear or branched alkyl radical having 2 to 6 carbon atoms. Examples are ethyl, n-propyl, isopropyl, n-butyl, sec-butyl, isobutyl, tert-butyl, pentyl, hexyl and constitution isomers thereof.

$C_1$-$C_{12}$-Alkyl is a linear or branched alkyl radical having 1 to 12 carbon atoms. Examples thereof are methyl, ethyl, n-propyl, isopropyl, n-butyl, sec-butyl, isobutyl, tert-butyl, pentyl, neopentyl, hexyl, heptyl, octyl, 2-ethylhexyl, nonyl, decyl, 2-propylheptyl, 4-methyl-2-propylhexyl, undecyl, dodecyl and constitution isomers thereof.

$C_1$-$C_{20}$-Alkyl is a linear or branched alkyl radical having 1 to 20 carbon atoms. Examples thereof are, besides the radicals specified above for $C_1$-$C_{12}$-alkyl, tridecyl, tetradecyl, pentadecyl, hexadecyl, heptadecyl, octadecyl, nonadecyl, eicosyl and constitution isomers thereof.

$C_2$-$C_4$-Alkyl is a linear or branched alkyl radical having 2 to 4 carbon atoms in which a hydrogen atom is replaced by a hydroxy group. Examples thereof are 2-hydroxyethyl, 2- and 3-hydroxypropyl, 1-hydroxy-2-propyl, 2-, 3- and 4-hydroxybutyl and the like.

$C_2$-$C_{10}$-Alkenyl is a linear or branched aliphatic radical having 2 to 10 carbon atoms and a C—C double bond. Examples thereof are ethenyl (vinyl), 1-propenyl, allyl (2-propenyl), 1-, 2- or 3-butenyl, 1-, 2-, 3- or 4-pentenyl, 1-, 2-, 3-, 4- or 5-hexenyl, 1-, 2-, 3-, 4-, 5- or 6-heptenyl, 1-, 2-, 3-, 4-, 6- or 7-octenyl, 1-, 2-, 3-, 4-, 5-, 6-, 7- or 8-nonenyl, 1-, 2-, 3-, 4-, 5-, 6-, 7-, L 8- or 9-decenyl and constitution isomers thereof.

$C_3$-$C_6$-Cycloalkyl is a cycloaliphatic saturated radical having 3 to 6 carbon atoms. Examples thereof are cyclopropyl, cyclobutyl, cyclopentyl and cyclohexyl.

Aryl is a carbocyclic aromatic radical having 6 to 14 carbon atoms, such as phenyl, naphthyl, anthracenyl or phenanthrenyl. Preferably, aryl is phenyl or naphthyl and in particular is phenyl.

Aryl-$C_1$-$C_4$-alkyl is $C_1$-$C_4$-alkyl which is as defined above, with a hydrogen atom being replaced by an aryl group. Examples are benzyl, phenethyl and the like.

$C_1$-$C_4$-Alkoxy is a linear or branched alkyl radical having 1 to 4 carbon atoms bonded via an oxygen atom. Examples thereof are methoxy, ethoxy, propoxy, isopropoxy, butoxy, sec-butoxy, isobutoxy and tert-butoxy.

$C_1$-$C_4$-Alkylene is a linear or branched divalent alkyl radical having 1, 2, 3 or 4 carbon atoms. Examples are —$CH_2$—, —$CH_2CH_2$—, —$CH(CH_3)$—, —$CH_2CH_2CH_2$—, —$CH(CH_3)CH_2$—, —$CH_2CH(CH_3)$—, —$C(CH_3)_2$—, —$CH_2CH_2CH_2CH_2$—, —$CH(CH_3)CH_2CH_2$—, —$CH_2CH_2CH(CH_3)$—, —$C(CH_3)_2CH_2$—, —$CH_2C(CH_3)_2$— and —$CH_2CH_2CH_2CH_2CH_2$—.

Linear $C_1$-$C_4$-alkylene is a linear divalent alkyl radical having 1, 2, 3 or 4 carbon atoms. Examples are —$CH_2CH_2$—, —$CH_2CH_2CH_2$— and —$CH_2CH_2CH_2CH_2$—.

$C_2$-$C_3$-Alkylene is a linear or branched divalent alkyl radical having 2 or 3 carbon atoms. Examples are —$CH_2CH_2$—, —$CH(CH_3)$—, —$CH_2CH_2CH_2$—, —$CH(CH_3)CH_2$—, $CH_2CH(CH_3)$— and —$C(CH_3)_2$—.

Linear or branched $C_2$-$C_4$-alkylene is a linear or branched divalent alkyl radical having 2, 3 or 4 carbon atoms. Examples are —$CH_2CH_2$—, —$CH(CH_3)$—, —$CH_2CH_2CH_2$—, —$CH(CH_3)CH_2$—, —$CH_2CH(CH_3)$—, —$C(CH_3)_2$—, —$CH_2CH_2CH_2CH_2$—, —$CH(CH_3)CH_2CH_2$—, —$CH_2CH_2CH(CH_3)$—, —$C(CH_3)_2CH_2$— and —$CH_2C(CH_3)_2$—.

Linear $C_2$-$C_4$-alkylene is a linear divalent alkyl radical having 2, 3 or 4 carbon atoms. Examples are —$CH_2CH_2$—, —$CH_2CH_2CH_2$— and —$CH_2CH_2CH_2CH_2$—.

Linear or branched $C_2$-$C_5$-alkylene is a linear or branched divalent alkyl radical having 2, 3, 4 or 5 carbon atoms. Examples are —$CH_2CH_2$—, —$CH(CH_3)$—, —$CH_2CH_2CH_2$—, —$CH(CH_3)CH_2$—, —$CH_2CH(CH_3)$—, —$C(CH_3)_2$—, —$CH_2CH_2CH_2CH_2$—, —$CH(CH_3)CH_2CH_2$—, —$CH_2CH_2CH(CH_3)$—, —$C(CH_3)^2CH_2$—, —$CH_2C(CH_3)_2$— and —$CH_2CH_2CH_2CH_2CH_2$—.

Linear or branched $C_2$-$C_6$-alkylene is a linear or branched divalent alkyl radical having 2, 3, 4, 5 or 6 carbon atoms. Examples are —$CH_2CH_2$—, —$CH(CH_3)$—, —$CH_2CH_2CH_2$—, —$CH(CH_3)CH_2$—, —$CH_2CH(CH_3)$—, —$C(CH_3)_2$—, —$CH_2CH_2CH_2CH_2$—, —$CH(CH_3)CH_2CH_2$—, —$CH_2CH_2CH(CH_3)$—, —$C(CH_3)^2CH_2$—, —$CH_2C(CH_3)_2$—, —$CH_2CH_2CH_2CH_2CH_2$— and —$CH_2CH_2CH_2CH_2CH_2CH_2$—.

Linear $C_2$-$C_6$-alkylene is a linear divalent alkyl radical having 2, 3, 4, 5 or 6 carbon atoms. Examples are —$CH_2CH_2$—, —$CH_2CH_2CH_2$—, —$CH_2CH_2CH_2CH_2$—, —$CH_2CH_2CH_2CH_2CH_2$— and —$CH_2CH_2CH_2CH_2CH_2CH_2$—.

Linear or branched $C_4$-$C_8$-alkylene is a linear or branched divalent alkyl radical having 4 to 8 carbon atoms. Examples are —$CH_2CH_2CH_2CH_2$—, —$CH(CH_3)CH_2CH_2$—, —$CH_2CH_2CH(CH_3)$—, —$C(CH_3)_2CH_2$—, —$CH_2C(CH_3)_2$—, —$CH_2CH_2CH_2CH_2CH_2$—, —$CH_2C(CH_3)_2CH_2$—, —$CH_2CH_2CH_2CH_2CH_2CH_2$—, —$(CH_2)_7$—, —$(CH_2)_8$— and positional isomers thereof.

Linear or branched $C_4$-$C_{10}$-alkylene is a linear or branched divalent alkyl radical having 4 to 10 carbon atoms. Examples are, besides the radicals specified above for $C_4$-$C_8$-alkylene, the higher homologues having 9 or 10 carbon atoms, such as nonylene and decylene.

Linear or branched $C_2$-$C_{10}$-alkylene is a linear or branched divalent alkyl radical having 2 to 10 carbon atoms. Examples are, besides the radicals specified above for $C_2$-$C_6$-alkylene, the higher homologues having 7 to 10 carbon atoms, such as heptylene, octylene, nonylene and decylene.

Linear or branched $C_1$-$C_{10}$-alkylene is a linear or branched divalent alkyl radical having 1 to 10 carbon atoms. A further example, besides the radicals specified above for $C_2$-$C_{10}$-alkylene, is —$CH_2$—.

Linear or branched $C_2$-$C_{20}$-alkylene is a linear or branched divalent alkyl radical having 2 to 20 carbon atoms. Examples are, besides the radicals specified above for $C_2$-$C_5$-alkylene, the higher homologues having 6 to 20 carbon atoms, such as hexylene, heptylene, octylene, nonylene, decylene, undecylene, dodecylene, tridecylene, tetradecylene, pentadecylene, hexadecylene, heptadecylene, octadecylene, nonadecylene and eicosylene.

Alkenylene is a linear or branched aliphatic mono- or poly-, e.g. mono- or di-, olefinically unsaturated divalent radical having, for example, 2 to 20 or 2 to 10 or 4 to 8 carbon atoms. If the radical comprises more than one carbon-carbon double bond, these are preferably not vicinal, i.e. not allenic.

Alkynylene is a linear or branched aliphatic divalent radical having, for example, 2 to 20 or 2 to 10 or 4 to 8 carbon atoms which comprises one or more, e.g. 1 or 2, carbon-carbon triple bonds.

$C_5$-$C_8$-Cycloalkylene is a divalent monocyclic, saturated hydrocarbon group having 5 to 8 carbon ring members. Examples are cyclopentane-1,2-diyl, cyclopentane-1,3-diyl, cyclohexane-1,2-diyl, cyclohexane-1,3-diyl, cyclohexane-1,4-diyl, cycloheptane-1,2-diyl, cycloheptane-1,3-diyl, cycloheptane-1,4-diyl, cyclooctane-1,2-diyl, cyclooctane-1,3-diyl, cyclooctane-1,4-diyl and cyclooctane-1,5-diyl.

5- or 6-membered saturated, partially unsaturated or aromatic heterocycle which comprises 1, 2 or 3 heteroatoms selected from O, S and N as ring members is, for example, tetrahydrofuranyl, tetrahydrothienyl, pyrrolidinyl, pyrazolidinyl, imidazolidinyl, oxazolidinyl, isoxazolidinyl, thiazolidinyl, isothiazolidinyl, triazolidinyl, oxadiazolidinyl, thiadiazolidinyl, piperidinyl, tetrahydropyranyl, piperazinyl, morpholinyl, thiomorpholinyl; dihydrofuranyl, dihydrothienyl, pyrrolinyl, pyrazolinyl, imidazolinyl, oxazolinyl, isoxazolinyl, thiazolinyl, isothiazolinyl, triazolinyl, oxadiazolinyl, thiadiazolinyl, tetrahydropyridyl, dihydropyridyl, dihydropyranyl, pyranyl; furanyl, thienyl, pyrrolyl, pyrazolyl, imidazolyl, oxazoylyl, isoxazolyl, thiazolyl, isothiazolyl, triazolyl, oxadiazolyl, thiadiazolyl, pyridyl, pyridazonyl, pyrimidyl, pyrazinyl and triazinyl.

N-bonded 5- or 6-membered unsaturated nonaromatic heterocycle which may additionally comprise one or two further nitrogen atoms or one further sulfur atom or oxygen atom as ring member is, for example, pyrrolin-1-yl, pyrazolin-1-yl, imidazolin-1-yl, 2,3-dihydrooxazol-3-yl, 2,3- and 2,5-dihydroisoxazol-2-yl, 2,3-dihydrothiazol-3-yl, 2,3- and 2,5-dihydroisothiazol-2-yl, [1,2,3]-1H-triazolin-1-yl, [1,2,4]-1H-triazolin-1-yl, [1,3,4]-1H-triazolin-1-yl, [1,2,3]-2H-triazolin-2-yl, 1,2-dihydropyridin-1-yl, 1,4-dihydropyridin-1-yl, 1,2,3,4-tetrahydropyridin-1-yl, 1,2-dihydropyridazin-1-yl, 1,4-dihydropyridazin-1-yl, 1,6-dihydropyridazin-1-yl, 1,2,3,4-tetrahydropyridazin-1-yl, 1,4,5,6-tetrahydropyridazin-1-yl, 1,2-dihydropyrimidin-1-yl, 1,4-dihydropyrimidin-1-yl, 1,6-dihydropyrimidin-1-yl, 1,2,3,4-tetrahydropyrimidin-1-yl, 1,4,5,6-tetrahydropyrimidin-1-yl, 1,2-dihydropyrazin-1-yl, 1,4-dihydropyrazin-1-yl, 1,2,3,4-tetrahydropyrazin-1-yl, 1,4-oxazin-4-yl, 2,3-dihydro-1,4-oxazin-4-yl, 2,3,5,6-tetrahydro-1,4-oxazin-4-yl, 1,4-thiazin-4-yl, 2,3-dihydro-1,4-thiazin-4-yl, 2,3,5,6-tetrahydro-1,4-thiazin-4-yl, 1,2-dihydro-1,3,5-triazin-1-yl, 1,2,3,4-tetrahydro-1,3,5-triazin-1-yl and the like.

N-bonded 5- or 6-membered unsaturated aromatic heterocycle which can additionally comprise a further nitrogen atom as ring member is, for example, pyrrol-1-yl, pyrazol-1-yl, imidazol-1-yl and triazol-1-yl.

A primary amino group is understood as meaning a radical —$NH_2$.

The statements made below regarding preferred embodiments of the process according to the invention, in particular regarding the monomers and further reaction components used according to the invention, regarding the reaction conditions and regarding the polymers obtainable with the process, and also regarding their use apply not only alone, per se, but also, in particular, in any combination.

Suitable melamine derivatives which are optionally used in step (i) are preferably selected from benzoguanamine, substituted melamines and melamine condensates, and mixtures thereof.

The melamine condensates are preferably selected from melam, melem, melon and higher condensates. Melam (empirical formula $C_6H_9N_{11}$) is a dimeric condensation product of 2-4-diamino-6-chloro-s-triazine with melamine. Melem (empirical formula $C_6H_6M_{10}$) is the triply amino-substituted tri-s-triazine (1,3,4,6,7,9,9b-heptaazaphenalene). Melon (empirical formula $C_6H_3N_9$) is likewise a heptazine.

Preferably, no melamine derivative is used.

The amines having at least two primary amino groups different from melamine and the optionally used at least one melamine derivative and used in step (i) as component (i.2) and the compounds used in step (iii) are selected dependently of one another and depending on whether steps (ii) and/or (iv) are carried out such that an amphiphilic polymer is formed. Thus, for the case that in step (i) a polar (hydrophilic) amine is used and/or the quaternization step (ii) and/or (iv), which greatly increases the polarity of the polymer segment obtained in step (i), is carried out, in step (iii) a nonpolar (lipophilic) compound or a compound which leads to the generation of a nonpolar polymer segment, is used, and vice versa.

The amines having at least two primary amino groups different from melamine and the optionally used at least one melamine derivative and used in step (i) as component (i.2) are preferably selected from
amines of the formula I $$NH_2—A—NH_2 \quad (I)$$

in which
A is a divalent aliphatic, alicyclic, aliphatic-alicyclic, aromatic or araliphatic radical, where the aforementioned radicals may also be interrupted by a carbonyl group or by a sulfone group and/or may be substituted by 1, 2, 3 or 4 radicals which are selected from $C_1$-$C_4$-alkyl; or is a divalent radical of the formula

in which
each X independently is O or $NR^A$, in which $R^A$ is H, $C_1$-$C_4$-alkyl, $C_2$-$C_4$-hydroxyalkyl or $C_1$-$C_4$-alkoxy and is preferably H, $C_1$-$C_4$-alkyl or $C_1$-$C_4$-alkoxy;
each B independently is $C_2$-$C_6$-alkylene; and
a is a number from 1 to 100, preferably 1 to 80 and in particular 1 to 20;
amines of the formula II

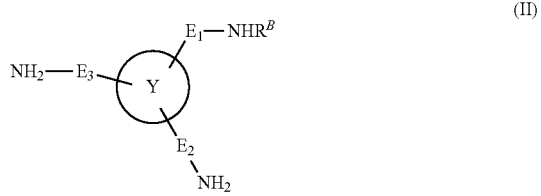

in which
Y is $CR^C$, N, $C_2$-$C_6$-alkyl, $C_3$-$C_6$-cycloalkyl, phenyl or a 5- or 6-membered, saturated, partially unsaturated or aromatic heterocyclic ring having 1, 2 or 3 heteroatoms as ring members which are selected from N, O and S;
$E_1$, $E_2$ and $E_3$, independently of one another, are a single bond, $C_1$-$C_{10}$-alkylene, $—NR^D—C_2$-$C_{10}$-alkylene or $—O—C_1$-$C_{10}$-alkylene, with the proviso that $E_1$, $E_2$ and $E_3$ are not a single bond and not $—NR^D—C_2$-$C_{10}$-alkylene when Y is N;
$R^C$ is H, $C_1$-$C_4$-alkyl, $C_2$-$C_4$-hydroxyalkyl or $C_1$-$C_4$-alkoxy and is preferably H, $C_1$-$C_4$-alkyl or $C_1$-$C_4$-alkoxy; and
$R^B$ and $R^D$, independently of one another, are H, $C_1$-$C_4$-alkyl, $C_2$-$C_4$-hydroxyalkyl or $C_1$-$C_4$-alkoxy and are preferably H, $C_1$-$C_4$-alkyl or $C_1$-$C_4$-alkoxy;
amines of the formula III

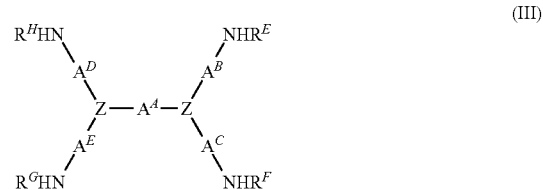

in which
$A^A$ has one of the meanings given for A;
$A^B$, $A^C$, $A^D$ and $A^E$, independently of one another, are $C_1$-$C_{10}$-alkylene;
Z is N or $CR^I$; and
$R^E$, $R^F$, $R^G$, $R^H$ and $R^I$, independently of one another, are H, $C_1$-$C_4$-alkyl, $C_2$-$C_4$-hydroxyalkyl or $C_1$-$C_4$-alkoxy and are preferably H, $C_1$-$C_4$-alkyl or $C_1$-$C_4$-alkoxy, where at least two of the radicals $R^E$, $R^F$, $R^G$ and $R^H$ are H; and
mixtures thereof.

Divalent aliphatic radicals are those which comprise no cycloaliphatic, aromatic or heterocyclic constituents. Examples are alkylene, alkenylene and alkynylene radicals.

Divalent alicyclic radicals can comprise one or more, e.g. one or two, alicyclic radicals; however, they comprise no aromatic or heterocyclic constituents. The alicyclic radicals can be substituted by aliphatic radicals, but bonding sites for the $NH_2$ groups are located on the alicyclic radical.

Divalent aliphatic-alicyclic radicals comprise not only at least one divalent aliphatic radical but also at least one divalent alicyclic radical, it being possible for the two bonding sites for the $NH_2$ groups to both either be located on the alicyclic radical(s) or both on the aliphatic radical(s) or one on an aliphatic radical and the other on an alicyclic radical.

Divalent aromatic radicals can comprise one or more, e.g. one or two, aromatic radicals; however, they comprise no alicyclic or heterocyclic constituents. The aromatic radicals can be substituted by aliphatic radicals, but both bonding sites for the $NH_2$ groups are located on the aromatic radical(s).

Divalent araliphatic radicals comprise not only at least one divalent aliphatic radical but also at least one divalent aromatic radical, it being possible for the two bonding sites for the $NH_2$ groups to be located either both on the aromatic radical(s) or both on the aliphatic radical(s) or one on an aliphatic radical and the other on an aromatic radical.

In one preferred embodiment, the divalent aliphatic radical A is linear or branched $C_2$-$C_{20}$-alkylene, particularly preferably linear or branched $C_2$-$C_{10}$-alkylene and in particular linear or branched $C_4$-$C_8$-alkylene. Examples of suitable amines in which the radical A has this meaning ($C_2$-$C_{20}$-alkylene) are 1,2-ethylenediamine, 1,2- and 1,3-propylenediamine, 2,2-dimethyl-1,3-propanediamine, 1,4-butylenediamine, 1,5-pentylenediamine, hexamethylenediamine, heptamethylenediamine, octamethylenediamine, nonamethylenediamine, decamethylenediamine, undecamethylenediamine, dodecamethylenediamine, tridecamethylenediamine, tetradecamethylenediamine, pentadecamethylenediamine, hexadecamethylenediamine, heptadecamethylenediamine, octadecamethylenediamine, nonadecamethylenediamine, eicosamethylenediamine, 2-butyl-2-ethyl-1,5-pentamethylenediamine, 2,2,4- or 2,4,4-trimethyl-1,6-hexamethylenediamine, 1,5-diamino-2-methylpentane, 1,4-diamino-4-methylpentane and the like.

In one preferred embodiment, the divalent alicyclic radicals A are selected from $C_5$-$C_8$-cycloalkylene which can carry 1, 2, 3 or 4 $C_1$-$C_4$-alkyl radicals. Examples of suitable amines in which the radical A has this meaning are cyclopentylenediamine, such as 1,2-diaminocyclopentane or 1,3-diaminocyclopentane, cyclohexylenediamine, such as 1,2-diaminocyclohexane, 1,3-diaminocyclohexane or 1,4-diaminocyclohexane, 1-methyl-2,4-diaminocyclohexane, 1-methyl-2,6-diaminocyclohexane, cycloheptylenediamine, such as 1,2-diaminocycloheptane, 1,3-diaminocycloheptane or 1,4-diaminocycloheptane, and cyclooctylenediamine, such as 1,2-diaminocyclooctane, 1,3-diaminocyclooctane, 1,4-diaminocyclooctane or 1,5-diaminocyclooctane. The amino groups ($NH_2$ groups) may be in the cis or trans position relative to one another.

In one preferred embodiment, the divalent aliphatic-alicyclic radicals A are selected from $C_5$-$C_8$-cycloalkylene-$C_1$-$C_4$-alkylene, $C_5$-$C_8$-cycloalkylene-$C_1$-$C_4$-alkylene-$C_5$-$C_8$-cycloalkylene and $C_1$-$C_4$-alkylene-$C_5$-$C_8$-cycloalkylene-$C_1$-$C_4$-alkylene, where the cycloalkylene radicals can carry 1, 2, 3 or 4 $C_1$-$C_4$-alkyl radicals. Examples of suitable amines in which the radical A has this meaning are diaminodicyclohexylmethane, isophoronediamine, bis(aminomethyl)cyclohexane, such as 1,1-bis(aminomethyl)-cyclohexane, 1,2-bis(aminomethyl)cyclohexane, 1,3-bis(aminomethyl)cyclohexane or 1,4-bis(aminomethyl)cyclohexane, 2-aminopropylcyclohexylamine, 3(4)-aminomethyl-1-methylcyclohexylamine and the like. The groups bonded to the alicyclic radical can in each case assume any desired position (cis/trans) relative to one another.

In one preferred embodiment, the divalent aromatic radicals A are selected from phenylene, biphenylene, naphthylene, phenylene-sulfone-phenylene and phenylene-carbonyl-phenylene, where the phenylene and naphthylene radicals can carry 1, 2, 3 or 4 $C_1$-$C_4$-alkyl radicals. Examples of suitable amines in which the radical A has this meaning are phenylenediamine, such as o-, m- and p-phenylenediamine, tolylenediamine, such as o-, m- and p-tolylenediamine, xylylenediamine, naphthylenediamine, such as 1,2-, 1,3-, 1,4-, 1,5-, 1,8-, 2,3-, 2,6- and 2,7-naphthylene, diaminodiphenylsulfone, such as 2,2'-, 3,3'- and 4,4'-diaminodiphenylsulfone, and diaminobenzophenone, such as 2,2'-, 3,3'- and 4,4'-diaminobenzophenone.

In one preferred embodiment, the divalent araliphatic radicals A are selected from phenylene-$C_1$-$C_4$-alkylene and phenylene-$C_1$-$C_4$-alkylenephenylene, where the phenylene radicals can carry 1, 2, 3 or 4 $C_1$-$C_4$-alkyl radicals. Examples of suitable amines in which the radical A has this meaning are diaminodiphenylmethane, such as 2,2'-, 3,3'- and 4,4'-diaminodiphenylmethane, and the like.

In one preferred embodiment, A is $-\!\!+\!\!B\!\!-\!\!X\!\!-\!\!]_a\!\!-\!\!B\!\!-\!\!$, in which X is O. a is here preferably a number from 2 to 100, particularly preferably 2 to 80 and in particular 2 to 20, e.g. 2 to 10 or 2 to 6. Examples of suitable amines in which the radical A has this meaning are amine-terminated polyoxyalkylene polyols, for example Jeff-Amines, such as 4,9-dioxadodecane-1,12-diamine and 4,7,10-trioxamidecane-1,13-diamine, or else more regular amine-terminated polyoxyalkylenediols (amine-terminated polyalkylene glycols; amine-terminated polyalkylene oxides), such as amine-terminated polyethylene glycols, amine-terminated polypropylene glycols or amine-terminated polybutylene glycols. The three last-mentioned amines (amine-terminated polyalkylene glycols) preferably have a molecular weight of from 200 to 3000 g/mol.

In an alternatively preferred embodiment, A is $-\!\!+\!\!B\!\!-\!\!X\!\!-\!\!]_a\!\!-\!\!B\!\!-\!\!$ and X is $NR^A$. $R^A$ here is preferably H or $C_1$-$C_4$-alkyl, particularly preferably H or methyl and in particular H. B is here in particular $C_2$-$C_3$-alkylene, such as 1,2-ethylene, 1,2-propylene and 1,3-propylene, and in particular is 1,2-ethylene. a is here preferably a number from 1 to 10, particularly preferably from 1 to 8 and in particular from 1 to 6. Examples of suitable amines in which the radical A has this meaning are diethylenetriamine, triethylenetetramine, tetraethylenepentamine, pentaethylenehexamine, hexaethyleneheptamine, heptaethyleneoctamine, octaethylenenonamine, higher polyethyleneimines, bis(3-aminopropyl)amine, bis(3-aminopropyl)methylamine, polyalkyleneimines with mixed ethylene/propylene groups as alkylene groups and the like.

In compounds II, $E_1$, $E_2$ and $E_3$, when Y is N, are not a single bond and not $-NR^D-C_2$-$C_{10}$-alkylene. When Y is N, $E_1$, $E_2$ and $E_3$ are preferably also not methylene ($C_1$-alkylene). If Y is $CR^C$, preferably at least two of the groups $E_1$, $E_2$ and $E_3$ are not a single bond.

When Y is a 5- or 6-membered, saturated, partially unsaturated or aromatic heterocyclic ring, then the three arms $-E_1$-$NHR^B$, $-E_2$-$NHR_2$ and $-E_3$-$NHR_2$ can be bonded either to carbon ring atoms or to nitrogen ring atoms in the heterocycle Y. If the arms $-E_1$-$NHR^B$, $-E_2$-$NHR_2$ and $-E_3$-$NHR_2$ are bonded to ring nitrogen atoms, then $E_1$, $E_2$ and $E_3$ are not a single bond and not $-NR^D-C_2$-$C_{10}$-alkylene. Preferably, the arms are bonded to different ring atoms in the heterocycle Y. The heterocyclic ring Y is preferably selected from 5- or 6-membered heteroaromatic rings having 1, 2 or 3 nitrogen atoms as ring members. Examples of such hetaryl rings are pyrrolyl, pyrazolyl, imidazolyl, pyridyl, pyrimidyl, pyrazinyl and pyridazonyl.

Examples of compounds II are N,N-bis(3-aminopropyl)ethylenediamine, N,N-bis(3-aminopropyl)propane-1,3-diamine, N,N-bis(3-aminopropyl)butane-1,4-diamine, tris(2-aminoethyl)amine, tris(2-aminopropyl)amine, tris(3-aminopropyl)amine, tris(2-aminobutyl)amine, tris(3-aminobutyl)amine, tris(4-aminobutyl)amine, tris(5-aminopentyl)amine, tris(6-aminohexyl)amine, trisaminohexane, trisaminononane, 4-aminomethyl-1,8-octamethylenediamine and the like.

The compounds III are amines with two primary amino groups and two further amino groups which are primary or secondary.

In compounds III, $A^A$ preferably has one of the meanings given as preferred for A. In particular, $A^A$ is $C_2$-$C_6$-alkylene, particularly preferably linear $C_2$-$C_6$-alkylene, such as 1,2-ethylene, 1,3-propylene, 1,4-butylene, pentamethylene and hexamethylene.

Z is preferably N.

$A^B$, $A^C$, $A^D$ and $A^E$ are preferably $C_2$-$C_6$-alkylene, particularly preferably linear $C_2$-$C_6$-alkylene, such as 1,2-ethylene, 1,3-propylene, 1,4-butylene, pentamethylene and hexamethylene, and in particular linear $C_2$-$C_4$-alkylene, such as 1,2-ethylene, 1,3-propylene and 1,4-butylene.

$R^E$, $R^F$, $R^G$, $R^H$ and $R^I$ are preferably H.

Examples of compounds III are N,N,N',N'-tetra(3-aminopropyl)ethylenediamine, N,N,N',N'-tetra(3-aminopropyl)-1,4-butylenediamine and the like.

As component (i.2) it is also possible to use mixtures of different amines.

The urea derivatives of component (i.3) are preferably selected from

- substituted ureas of the formula $R^1R^2N$—C(=O)—$NR^3R^4$, in which $R^1$, $R^2$, $R^3$ and $R^4$, independently of one another, are selected from hydrogen, $C_1$-$C_{12}$-alkyl, aryl and aryl-$C_1$-$C_4$-alkyl, where at least one of the radicals $R^1$, $R^2$, $R^3$ and $R^4$ is not hydrogen; or $R^1$ and $R^2$ and/or $R^3$ and $R^4$ are in each case together $C_2$-$C_5$-alkylene, where a methylene group (i.e. a group $CH_2$ in the alkylene chain) may optionally be replaced by a carbonyl group;
  or $R^1$ and $R^3$ are together $C_2$-$C_5$-alkylene, where a methylene group (i.e. a group $CH_2$ in the alkylene chain) may optionally be replaced by a carbonyl group; or $R^1$ and $R^2$ and/or $R^3$ and $R^4$, in each case together with the nitrogen atom to which they are bonded, form a 5- or 6-membered unsaturated aromatic or nonaromatic ring which can comprise one or two further nitrogen atoms or a sulfur atom or oxygen atom as ring member (i.e. $R^1$ and $R^2$ or $R^3$ and $R^4$, together with the nitrogen atom to which they are bonded, are an N-bonded 5- or 6-membered unsaturated aromatic or nonaromatic ring which can comprise 1 or 2 further nitrogen atoms or one sulfur atom or oxygen atom as ring member);
- biuret;
- thiourea;
- substituted thioureas of the formula $R^5R^6N$—C(=S)—$NR^7R^8$, in which $R^5$, $R^6$, $R^7$ and $R^8$, independently of one another, are selected from hydrogen, $C_1$-$C_{12}$-alkyl, aryl and aryl-$C_1$-$C_4$-alkyl, where at least one of the radicals $R^5$, $R^6$, $R^7$ and $R^8$ is not hydrogen;
  or $R^5$ and $R^6$ and/or $R^7$ and $R^8$, in each case together, are $C_2$-$C_5$-alkylene, where a methylene group (i.e. a group $CH_2$ in the alkylene chain) may optionally be replaced by a carbonyl group;
  or $R^5$ and $R^7$ are together $C_2$-$C_5$-alkylene, where a methylene group (i.e. a group $CH_2$ in the alkylene chain) may be optionally replaced by a carbonyl group;
  or $R^5$ and $R^6$ and/or $R^7$ and $R^8$, in each case together with the nitrogen atom to which they are bonded, form a 5- or 6-membered unsaturated aromatic or nonaromatic ring which can comprise one or two further nitrogen atoms or a sulfur atom or oxygen atom as ring member; (i.e. $R^5$ and $R^6$ or $R^7$ and $R^8$, together with the nitrogen atom to which they are bonded, are an N-bonded 5- or 6-membered unsaturated aromatic or nonaromatic ring which can comprise 1 or 2 further nitrogen atoms or a sulfur atom or oxygen atom as ring member);
- guanidine;
- substituted guanidines of the formula $R^9R^{10}N$—C(=$NR^{11}$)—$NR^{12}R^{13}$, in which $R^9$, $R^{10}$, $R^{11}$, $R^{12}$ and $R^{13}$, independently of one another, are selected from hydrogen, $C_1$-$C_{12}$-alkyl, aryl and aryl-$C_1$-$C_4$-alkyl, where at least one of the radicals $R^9$, $R^{10}$, $R^{11}$, $R^{12}$ and $R^{13}$ is not hydrogen;
  or $R^9$ and $R^{10}$ and/or $R^{12}$ and $R^{13}$, in each case together, are $C_2$-$C_5$-alkylene, where a methylene group (i.e. a group $CH_2$ in the alkylene chain) may optionally be replaced by a carbonyl group; or $R^9$ and $R^{12}$ together are $C_2$-$C_5$-alkylene, where a methylene group (i.e. a group $CH_2$ in the alkylene chain) may optionally be replaced by a carbonyl group;
  or $R^9$ and $R^{10}$ and/or $R^{12}$ and $R^{13}$, in each case together with the nitrogen atom to which they are bonded, form a 5- or 6-membered unsaturated aromatic or nonaromatic ring which can additionally comprise a further nitrogen atom, sulfur atom or oxygen atom as ring member (i.e. $R^9$ and $R^{10}$ or $R^{12}$ and $R^{13}$, together with the nitrogen atom to which they are bonded, are an N-bonded 5- or 6-membered unsaturated aromatic or nonaromatic ring which can comprise 1 or 2 further nitrogen atoms or a sulfur atom or oxygen atom as ring member); and
- carbonic acid esters of the formula $R^{14}$—O—CO—O—$R^{15}$, in which $R^{14}$ and $R^{15}$, independently of one another, are selected from $C_1$-$C_{12}$-alkyl, aryl and aryl-$C_1$-$C_4$-alkyl or $R^{14}$ and $R^{15}$ together are $C_2$-$C_5$-alkylene.

It is of course also possible to use mixtures of different urea derivatives.

In one preferred embodiment, in the substituted ureas, $R^2$ and $R^4$ are hydrogen and $R^1$ and $R^3$ are identical or different and are $C_1$-$C_{12}$-alkyl, aryl or aryl-$C_1$-$C_4$-alkyl. Examples thereof are N,N'-dimethylurea, N,N'-diethylurea, N,N'-dipropylurea, N,N'-diisopropylurea, N,N'-di-n-butylurea, N,N'-diisobutylurea, N,N'-di-sec-butylurea, N,N'-di-tert-butylurea, N,N'-dipentylurea, N,N'-dihexylurea, N,N'-diheptylurea, N,N'-dioctylurea, N,N'-didecylurea, N,N'-didodecylurea, N,N'-diphenylurea, N,N'-dinaphthylurea, N,N'-ditolylurea, N,N'-dibenzylurea, N-methyl-N'-phenylurea and N-ethyl-N'-phenylurea.

In an alternatively preferred embodiment, $R^1$, $R^2$, $R^3$ and $R^4$ are identical and are linear $C_1$-$C_4$-alkyl. Examples thereof are N,N,N',N'-tetramethylurea and N,N,N',N'-tetraethylurea.

In an alternatively preferred embodiment, $R^1$ and $R^2$ and also $R^3$ and $R^4$ are in each case together $C_2$-$C_5$-alkylene, where a methylene group ($CH_2$) in the alkylene chain can be prelaced by a carbonyl group (CO); i.e. $R^1$ and $R^2$ together form a $C_2$-$C_5$-alkylene group in which a methylene group ($CH_2$) in the alkylene chain can be replaced by a carbonyl group (CO), and $R^3$ and $R^4$ together form a $C_2$-$C_5$-alkylene group in which a methylene group ($CH_2$) in the alkylene chain can be replaced by a carbonyl group (CO). Examples thereof are di(tetrahydro-1H-pyrrol-1-yl)methanone, bis(pentamethylene)urea and carbonylbiscaprolactam.

In an alternatively preferred embodiment, $R^2$ and $R^4$ are hydrogen and $R^1$ and $R^3$ together form a $C_2$-$C_5$-alkylene group, where a methylene group can be replaced by a carbonyl group. Examples thereof are ethyleneurea and also 1,2- or 1,3-propyleneurea.

In an alternatively preferred embodiment, $R^1$ and $R^2$ and also $R^3$ and $R^4$, in each case together with the nitrogen atom to which they are bonded, form an unsaturated aromatic or nonaromatic heterocycle as defined above. Examples thereof are carbonyldipyrazole and carbonyldiimidazole.

In one preferred embodiment, in the substituted thioureas, $R^6$ and $R^8$ are hydrogen and $R^5$ and $R^7$ are identical or different and are $C_1$-$C_{12}$-alkyl, aryl or aryl-$C_1$-$C_4$-alkyl. Examples thereof are N,N'-dimethylthiourea, N,N'-diethylthiourea, N,N'-dipropylthiourea, N,N'-diisopropylthiourea, N,N'-di-n-butylthiourea, N,N'-diisobutylthiourea, N,N'-di-sec-butylthiourea, N,N'-di-tert-butylthiourea, N,N'-dipentylthiourea, N,N'-dihexylthiourea, N,N'-diheptylthiourea, N,N'-dioctylthiourea, N,N'-didecylthiourea, N,N'-didodecylthiourea, N,N'-diphenylthiourea, N,N'-dinaphthylthiourea, N,N'-ditolylthiourea, N,N'-dibenzylthiourea, N-methyl-N'-phenylthiourea and N-ethyl-N'-phenylthiourea.

In an alternatively preferred embodiment, $R^5$, $R^6$, $R^7$ and $R^8$ are identical and are linear $C_1$-$C_4$-alkyl. Examples thereof are N,N,N',N'-tetramethylthiourea and N,N,N',N'-tetraethylthiourea.

In an alternatively preferred embodiment, $R^5$ and $R^6$ and also $R^7$ and $R^8$ are in each case together $C_2$-$C_5$-alkylene, where a methylene group ($CH_2$) in the alkylene chain can be replaced by a carbonyl group (CO); i.e. $R^5$ and $R^6$ together form a $C_2$-$C_5$-alkylene group in which a methylene group ($CH_2$) in the alkylene chain can be replaced by a carbonyl group (CO), and $R^7$ and $R^8$ together form a $C_2$-$C_5$-alkylene group in which a methylene group ($CH_2$) in the alkylene chain can be replaced by a carbonyl group (CO). Examples thereof are di(tetrahydro-1H-pyrrol-1-yl)methanethione, bis(pentamethylene)thiourea and thiocarbonylbiscaprolactam.

In an alternatively preferred embodiment, $R^6$ and $R^8$ are hydrogen and $R^5$ and $R^7$ together form a $C_2$-$C_5$-alkylene group, where a methylene group can be replaced by a thiocarbonyl group. Examples thereof are ethylenethiourea and also 1,2- or 1,3-propylenethiourea.

In an alternatively preferred embodiment, $R^5$ and $R^6$, and also $R^7$ and $R^8$, in each case together with the nitrogen atom to which they are bonded, form an unsaturated aromatic or nonaromatic heterocycle as defined above. Examples thereof are thiocarbonyldipyrazole and thiocarbonyldiimidazole.

Guanidine can also be used in the form of a guanidine salt, such as guanidine nitrate or in particular guanidine carbonate.

In one preferred embodiment, in the substituted guanidines, $R^{10}$, $R^{11}$ and $R^{13}$ are hydrogen and $R^9$ and $R^{12}$ are identical or different and are $C_1$-$C_{12}$-alkyl, aryl or aryl-$C_1$-$C_4$-alkyl. Examples thereof are N,N'-dimethylguanidine, N,N'-diethylguanidine, N,N'-dipropylguanidine, N,N'-diisopropylguanidine, N,N'-di-n-butylguanidine, N,N'-diisobutylguanidine, N,N'-di-sec-butylguanidine, N,N'-di-tert-butylguanidine, N,N'-dipentylguanidine, N,N'-dihexylguanidine, N,N'-diheptylguanidine, N,N'-dioctylguanidine, N,N'-didecylguanidine, N,N'-didodecylguanidine, N,N'-diphenylguanidine, N,N'-dinaphthylguanidine, N,N'-ditolylguanidine, N,N'-dibenzylguanidine, N-methyl-N'-phenylguanidine and N-ethyl-N'-phenylguanidine.

In an alternatively preferred embodiment, $R^9$, $R^{10}$, $R^{12}$ and $R^{13}$ are identical and are linear $C_1$-$C_4$-alkyl and $R^{11}$ is H or methyl and in particular is H. Examples thereof are N,N,N',N'-tetramethylguanidine and N,N,N',N'-tetraethylguanidine.

In an alternatively preferred embodiment, $R^9$ and $R^{10}$, and also $R^{12}$ and $R^{13}$ are in each case together $C_2$-$C_5$-alkylene, where a methylene group ($CH_2$) can be replaced by a carbonyl group (CO); i.e. $R^9$ and $R^{10}$ together form a $C_2$-$C_5$-alkylene group in which a methylene group ($CH_2$) can be replaced by a carbonyl group (CO), and $R^{12}$ and $R^{13}$ together form a $C_2$-$C_5$-alkylene group in which a methylene group ($CH_2$) can be replaced by a carbonyl group (CO), and $R^{11}$ is H or methyl and in particular is H. Examples thereof are di(tetrahydro-1H-pyrrol-1-yl)imine, bis(pentamethylene)guanidine and iminobiscaprolactam.

In an alternatively preferred embodiment, $R^{10}$, $R^{11}$ and $R^{13}$ are hydrogen and $R^9$ and $R^{12}$ together form a $C_2$-$C_5$-alkylene group, where a methylene group may optionally be replaced by a carbonyl group. Examples thereof are ethyleneguanidine, and also 1,2- or 1,3-propyleneguanidine.

In an alternatively preferred embodiment, $R^9$ and $R^{10}$, and also $R^{12}$ and $R^{13}$, in each case together with the nitrogen atom to which they are bonded, form an unsaturated aromatic or nonaromatic heterocycle as defined above, and $R^{11}$ is H or methyl and in particular is H. Examples thereof are iminodipyrazole and iminodiimidazole.

In one preferred embodiment, $R^{14}$ and $R^{15}$ are $C_1$-$C_4$-alkyl. Particularly preferably, both radicals are identical. Examples thereof are dimethyl carbonate, diethyl carbonate, dipropyl carbonate, diisopropyl carbonate, di-n-butyl carbonate, di-sec-butyl carbonate, diisobutyl carbonate and di-tert-butyl carbonate. Among these, preference is given to dimethyl carbonate and diethyl carbonate.

In an alternatively preferred embodiment, $R^{14}$ and $R^{15}$ are together $C_2$-$C_5$-alkylene and preferably $C_2$-$C_3$-alkylene. Examples of such carbonates are ethylene carbonate, and also 1,2- and 1,3-propylene carbonate.

The urea derivatives are particularly preferably selected among the aforementioned substituted ureas, biuret, thiourea, aforementioned substituted thioureas and the aforementioned carbonic acid esters.

Among the aforementioned urea derivatives, the substituted ureas, thiourea, the substituted thioureas and the carbonic acid esters are more preferred. Even more preference is given to the substituted ureas, thiourea and the carbonic acid esters. Among these, preference is given to thiourea, N,N'-dimethylurea, N,N'-diethylurea, N,N'-di-n-butylurea, N,N'-diisobutylurea, N,N,N',N'-tetramethylurea, dimethyl carbonate, diethyl carbonate, ethylene carbonate and 1,2-propylene carbonate.

As component (i.3), particular preference is given to using urea or a substituted urea of the formula $R^1R^2N$—C(=O)—$NR^3R^4$, in which $R^1$, $R^2$, $R^3$ and $R^4$, independently of one another, are as defined above. Preferably, $R^1$ and $R^3$ are H or $C_1$-$C_4$-alkyl, in particular methyl or ethyl, and $R^2$ and $R^4$ are $C_1$-$C_4$-alkyl, specifically methyl or ethyl. In particular, as component (i.3), urea itself is used, optionally in combination with one of the aforementioned urea derivatives, and especially only urea.

Suitable at least difunctional di- or polyisocyanates (i.4) are the aliphatic, cycloaliphatic, araliphatic and aromatic di- or polyisocyanates known according to the prior art and specified below by way of example. Mention is to be made here of preferably 4,4'-diphenylmethane diisocyanate, the mixtures of monomeric diphenylmethane diisocyanates and oligomeric diphenylmethane diisocyanates (polymer-MDI), tetramethylene diisocyanate, tetramethylene diisocyanate trimers, hexamethylene diisocyanate, hexamethylene diisocyanate trimers, isophorone diisocyanate trimer, 4,4'-methylenebis(cyclohexyl) diisocyanate, xylylene diisocyanate, tetramethylxylylene diisocyanate, dodecyl diisocyanate, lysine alkyl ester diisocyanate, where alkyl is $C_1$-$C_{10}$-alkyl, 1,4-diisocyanatocyclohexane or 4-isocyanatomethyl-1,8-octamethylene diisocyanate.

Particular preference is given to di- or polyisocyanates which have NCO groups of differing reactivity. Mention may be made here of 2,4-tolylene diisocyanate (2,4-TDI), 2,4'-diphenylmethane diisocyanate (2,4'-MDI), triisocyanatotoluene, isophorone diisocyanate (IPDI), 2-butyl-2-ethyl-pentamethylene diisocyanate, 2,2,4- or 2,4,4-trimethyl-1,6-hexamethylene diisocyanate, 2-isocyanatopropylcyclohexyl isocyanate, 3(4)-isocyanatomethyl-1-methylcyclohexyl isocyanate, 1,4-diisocyanato-4-methylpentane, 2,4'-methylenebis(cyclohexyl) diisocyanate and 4-methylcyclohexane 1,3-diisocyanate (H-TDI).

Furthermore, di- or polyisocyanates are suitable the NCO groups of which are initially equally reactive, but in which the first addition of a reactant to one NCO group can induce a reactivity decrease in the case of the second NCO group. Examples thereof are isocyanates, the NCO groups of which are coupled via a delocalized π-electron system, e.g. 1,3- and 1,4-phenylene diisocyanate, 1,5-naphthylene diisocyanate, diphenyl diisocyanate, tolidine diisocyanate or 2,6-tolylene diisocyanate.

Furthermore, it is possible to use oligo- or polyisocyanates which can be prepared from the aforementioned di- or polyisocyanates or mixtures thereof through linkage by means of urethane, allophanate, urea, biuret, uretdione, amide, isocyanurate, carbodiimide, uretonimine, oxadiazinetrione or iminooxadiazinedione structures.

In one embodiment, capped (blocked) di- or polyisocyanates are used as component (i.4). In capped or blocked di- or polyisocyanates, the isocyanate groups have been reversibly converted to another functional group which can be converted back to the isocyanate group under suitable conditions. Preferably, the isocyanate group is reacted with an alcohol, preferably a monoalcohol, to give a urethane group. The alcohol is generally cleaved off easily during the reaction of the blocked di- or polyisocyanate in step (i) [usually with the amine (i.2)]. The blocking of the isocyanate groups lowers the very high reactivity of the isocyanates and permits a controlled reaction with the amine (iii.2) and thus a controlled build-up of polyureas.

Other blocking reagents for NCO groups are notable for the fact that they ensure thermally reversible blocking of the isocyanate groups at temperatures of in general below 160° C. Blocking agents of this type are generally used for the modification of isocyanates which are used in thermally curable single-component polyurethane systems. These blocking agents are described in detail, for example, in Z. W. Wicks, Prog. Org. Coat. 3 (1975) 73-99 and Prog. Org. Coat. 9 (1981), 3-28, D. A. Wicks and Z. W. Wicks, Prog. Org. Coat. 36 (1999), 148-172 and Prog. Org. Coat. 41 (2001), 1-83, and also in Houben-Weyl, Methoden der Organischen Chemie [Methods in organic chemistry], Vol. XIV/2,61 ff., Georg Thieme Verlag, Stuttgart 1963. Preferably, blocking agents of this type are selected from phenols, caprolactam, 1H-imidazole, 2-methylimidazole, 1,2,4-triazole, 3,5-dimethylpyrazole, malonic acid dialkyl esters, acetanilide, acetone oxime and butanone oxime.

The at least one carboxylic acid having at least two carboxyl groups (i.5) may be aliphatic, cycloaliphatic or aromatic di- or tricarboxylic acids or polycarboxylic acid.

Aliphatic dicarboxylic acids are, for example, oxalic acid, malonic acid, succinic acid, glutaric acid, adipic acid, pimelic acid, suberic acid, azelaic acid, sebacic acid, undecane-α,ω-dioic acid and dodecane-α,ω-dioic acid. Furthermore, unsaturated aliphatic dicarboxylic acids such as maleic acid, fumaric acid and sorbic acid also belong to this group.

Cycloaliphatic dicarboxylic acids are, for example, cis- and trans-cyclohexane-1,2-dicarboxylic acid, cis- and trans-cyclohexane-1,3-dicarboxylic acid, cis- and trans-cyclopentane-1,4-dicarboxylic acid and cis- and trans-cyclopentane-1,3-dicarboxylic acid.

Aromatic dicarboxylic acids are, for example, phthalic acid, isophthalic acid and terephthalic acid.

One example of an aliphatic tricarboxylic acid is aconitic acid (E-1,2,3-propenetri-carboxylic acid).

One example of a cycloaliphatic tricarboxylic acid is 1,3,5-cyclohexanetricarboxylic acid.

Aromatic tricarboxylic acids are, for example, 1,2,4-benzenetricarboxylic acid and 1,3,5-benzenetricarboxylic acid.

Examples of carboxylic acids having more than three carboxyl groups are 1,2,4,5-benzenetetracarboxylic acid (pyromellitic acid), 1,2,3,4,5,6-benzenehexacarboxylic acid (mellitic acid) and low molecular weight polyacrylic acid or polymethacrylic acid.

The carboxylic acids can also carry one or more radicals which are selected from $C_1$-$C_{20}$-alkyl, $C_3$-$C_6$-cycloalkyl, $C_2$-$C_{10}$-alkenyl and aryl. Examples thereof are 2-methylmalonic acid, 2-ethylmalonic acid, 2-phenylmalonic acid, 2-methylsuccinic acid, 2-ethylsuccinic acid, $C_{18}$-alkenylsuccinic acid, 2-phenylsuccinic acid, itaconic acid and 3,3-dimethylglutaric acid.

The carboxylic acids can be used as they are or in the form of suitable derivatives. Suitable derivatives are the respective anhydrides and the mono-, di- or polyesters, preferably the mono-, di- or poly-$C_1$-$C_4$-alkyl esters, in particular the mono-, di- or polymethyl or -ethyl esters, and also, furthermore, the mono-, di- or polyvinyl esters and mixed esters.

As component (i.5) it is also possible to use mixtures of different carboxylic acids and/or different carboxylic acid derivatives.

As component (i.5) it is preferred to use at least one dicarboxylic acid or at least one dicarboxylic acid derivative or a mixture thereof.

Preference among these is given to malonic acid, succinic acid, glutaric acid, adipic acid, 1,2-, 1,3- or 1,4-cyclohexanedicarboxylic acid, phthalic acid, isophthalic acid, terephthalic acid and the mono- and dialkyl esters, in particular the mono- and di-$C_1$-$C_4$-alkyl esters, of the aforementioned acids.

The at least one compound which can enter into a condensation reaction or addition reaction with amino groups used in step (iii) is selected from aliphatic monocarboxylic acids or derivatives thereof, polycarboxylic acids or derivatives thereof, aliphatic, cycloaliphatic or aromatic optionally capped isocyanates, aliphatic monoamines, aliphatic polyamines, amine-terminated polyethers, alkylene oxides, aldehydes, ketones and aldehydes in combination with a CH-acidic compound or with a hydroxyaromatic.

Aliphatic monocarboxylic acids are preferably those having 1 to 22 carbon atoms, such as formic acid, acetic acid, propionic acid, butyric acid, isobutyric acid, valeric acid, isovaleric acid, caproic acid, enanthic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid, tuberculostearic acid, arachic acid, behenic acid, palmitoleic acid, oleic acid, erucic acid, sorbic acid, linoleic acid, linolenic acid, elaostearic acid, arachidonic acid, clupanodonic acid and docosahexaenoic acid.

Suitable carboxylic acid derivatives are all derivatives which are suitable for reacting with the amino groups of the polymer from step (i) or (ii) to give an amide bond. These include halides, in particular acid chlorides, anhydrides and esters.

The anhydrides can either be the symmetrical anhydrides or asymmetrical anhydrides. The latter are chosen such that the "foreign" acid group can easily be displaced by the amino groups of the polymer from step (i) or (ii). Suitable acid derivatives with which the aforementioned carboxylic acid can form suitable mixed anhydrides are, for example, the esters of chloroformic acid, e.g. isopropyl chloroformate and isobutyl chloroformate, or of chloroacetic acid.

Suitable esters are, in particular, the $C_1$-$C_4$-alkyl esters, such as the methyl, ethyl, propyl, isopropyl, n-butyl, sec-butyl, isobutyl or tert-butyl esters. Also suitable, however, are esters which are derived from $C_2$-$C_6$-polyols, such as glycol, glycerol, trimethylolpropane, erythritol, pentaerythritol and sorbitol, the glycerol ester being preferred. If polyol esters are used, then mixed esters, i.e. esters with different carboxylic acid radicals, can be used. Furthermore of suitability are active esters which are obtained formally by the reaction of the acid with an active-ester-forming alcohol, such as p-nitrophenol, N-hydroxybenzotriazole (HOBt), N-hydroxysuccinimide or OPfp (pentafluorophenol).

Preference is given to using the carboxylic acids themselves (i.e. not their derivatives).

Suitable polycarboxylic acids and derivatives thereof are, for example, α,β-dicarboxylic acids or derivatives thereof, such as oxalic acid, malonic acid, succinic acid, maleic acid, fumaric acid, glutaric acid, adipic acid, pimelic acid, azelaic acid, sebacic acid, sorbic acid, polyalkylene-substituted succinic acid and derivatives thereof. Polyalkylene-substituted succinic acid is preferably polyisobutylene-substituted succinic acid, which is obtainable, for example, by reacting polyisobutene with maleic anhydride under the reaction conditions of an ene reaction. The polyalkenyl radicals, specifically the polyisobutenyl radicals, here have a number-average molecular weight $M_n$ of preferably 100 to 5000, particularly preferably 200 to 1000. As regards suitable acid derivatives, reference is made to the above statements. Preferably, in the case of the dicarboxylic acid, the acid anhydrides, preferably the internal anhydrides (i.e. succinic anhydride, maleic anhydride, adipic anhydride, etc.) are used.

Suitable aliphatic, cycloaliphatic or aromatic optionally capped isocyanates are, for example, methyl isocyanate, ethyl isocyanate, propyl isocyanate, butyl isocyanate, pentyl isocyanate, hexyl isocyanate, cyclohexyl isocyanate, phenyl isocyanate and the like.

Suitable aliphatic monoamines are preferably primary or secondary, particularly preferably primary. Examples thereof are methylamine, ethylamine, propylamine, butylamine, pentylamine, hexylamine, heptylamine, octylamine, nonylamine, decylamine, dodecylamine, [3-(2-ethylhexyl)propyl]amine and the like.

Suitable aliphatic polyamines are, for example, polyethyleneimines, polypropylenepolyamines, polybutylenepolyamines, polypentylenepolyamines and the like.

Suitable alkylene oxides are, for example, ethylene oxide, propylene oxide, butylene oxide, pentylene oxide, styrene oxide and the like.

Suitable amine-terminated polyethers are, for example, amine-terminated polyethylene glycol ethers ($NH_2$—[($CH_2)_2$—O—]$_p$—($CH_2)_2$—$NH_2$; p=1 to 5000), polypropylene glycol ethers ($NH_2$—[($CH_2)_3$—O—]$_p$—($CH_2)_3$—$NH_2$; $NH_2$—[($CH_2$—$CH(CH_3)$—O—]$_p$—($CH_2$—CH($CH_3$)—$NH_2$; p=1 to 5000) and amine-terminated polytetrahydrofurans ($NH_2$—[($CH_2)_4$—O—]$_p$—($CH_2)_4$—$NH_2$; p=1 to 5000) with a molecular weight of from 200 to 360 000, but also irregular amine-terminated polyethylene glycol ethers, such as Jeff-Amines (also see below, embodiments A and B).

Suitable ketones or aldehydes are, for example, acetaldehyde, propanal, butanal, pentanal, hexanal, heptanal, octanal, nonanal, decanal, benzaldehyde, methyl butyl ketone, cyclohexanone, benzophenone and the like.

Suitable aldehydes which are used in combination with at least one CH-acidic compound or with at least one hydroxyaromatic are those which can enter into a Mannich reaction with the amino groups of the polymer from step (i) or (ii). Formaldehyde is preferably used as aldehyde. Suitable CH-acidic compounds are, for example, acetaldehyde, propanal, butanal, pentanal, hexanal and the like. Suitable hydroxyaromatics are, for example, phenol, cresol, ethylphenol, propylphenol, butylphenol, such as 2- or 4-butylphenol, tert-butylphenol, such as 4-tert-butylphenol, and polyalkenyl-substituted phenol, such as polyisobutyl (PIB)-substituted phenols, for example those which have a PIB radical having a number-average molecular weight $M_n$ of from 100 to 5000, e.g. 200 to 1000.

As regards suitable reaction conditions in step (iii), reference is made to the corresponding statements relating to embodiment A below.

The process according to the invention serves for the preparation of amphiphilic functionalized highly branched melamine-polyamine polymers. Amphiphilic is the term used to refer to (monomeric or polymeric) compounds which have both hydrophilic and lipophilic properties.

Preferably, the polymers according to the invention have a core/shell structure. Here, the polymers which are prepared in step (i) and, if carried out, step (ii) preferably form the core, and the compounds fused-on in step (iii) form the shell.

In one preferred embodiment, the polymers obtained in step (i) and, if carried out, step (ii) (which preferably form the core of the polymer according to the invention) have hydrophilic properties (if step (ii) is carried out, the polymer obtained in this step will generally have hydrophilic properties), whereas the segments in the polymer which are produced by the condensation reaction in step (iii) (and which preferably form the shell of the polymer according to the invention) have lipophilic properties.

In one alternatively preferred embodiment, the polymers obtained in step (i) which preferably form the core of the polymer according to the invention) have lipophilic properties whereas the segments in the polymer which are produced by the condensation reaction in step (iii) (and which preferably form the shell of the polymer according to the invention) have hydrophilic properties.

Within the context of the present invention, unless mentioned otherwise, the terms "lipophilic" and "hydrophilic" are used as relative terms; i.e. a hydrophilic segment (e.g. the core or alternatively the shell) in the polymer according to the invention is a segment which is more polar than a lipophilic segment (e.g. the shell or alternatively the core). The polarity difference here must of course not be marginal, but must be sufficiently great to give rise to an amphiphilic polymer. The amphiphilicity here must be so great that the polymer is interface-active and can be used, for example, as surfactant or emulsifier.

PREFERRED EMBODIMENT A OF THE INVENTION

In this embodiment, a hydrophilic polymer is prepared in step (i) and in the optional step (ii).

Accordingly, a preferred embodiment of the invention relates to a process A, comprising the following steps:
(A-i) condensation of
 (A-i.1) melamine and optionally at least one melamine derivative with
 (A-i.2) at least one amine different therefrom having at least two primary amino groups;
 and optionally moreover also with
 (A-i.3) urea and/or at least one urea derivative; and/or
 (A-i.4) at least one at least difunctional di- or polyisocyanate; and/or
 (A-i.5) at least one carboxylic acid having at least two carboxyl groups or at least one derivative thereof;
(A-ii) optionally quaternization of some of the amino groups of the polymer segment obtained in step (A-i);
(A-iii) reacting the polymer segment obtained in step (A-i) or (A-ii) with at least one compound which can enter into a condensation reaction or addition reaction with amino groups and which leads to the formation of a hydrophobic polymer segment, the compound being selected from aliphatic monocarboxylic acids or derivatives thereof, polycarboxylic acids or derivatives thereof, aliphatic, cycloaliphatic or aromatic optionally capped isocyanates, aliphatic monoamines, aliphatic polyamines, amine-terminated polyethers, alkylene oxides, aldehydes, ketones, and aldehydes in combination with a CH-acidic compound or a hydroxyaromatic; and
(A-iv) optionally quaternization of at least some of the amino groups in the polymer segment obtained in step (A-i);
where a hydrophilic polymer segment is obtained in step (A-i), (A-ii) or (A-iv).

For this purpose, the at least one amine (A-i.2) different from melamine or the melamine derivative and used in step (A-i) is hydrophilic and is preferably selected from
 1,2-ethylenediamine,
 1,2-propylenediamine,
 1,3-propylenediamine,
 polyamines with two primary amino groups and at least one secondary or tertiary amino group and/or at least one ether oxygen atom, in which all amino groups and ether oxygen atoms are arranged linearly relative to one another and in which the ratio of the number of carbon atoms present in the polyamine to the number of nitrogen atoms present in the polyamine and optionally present oxygen atoms is less than or equal to 2.5:1, preferably less than or equal to 2.3:1 and in particular less than or equal to 2:1, and
 polyamines with at least two primary amino groups, a further primary or secondary amino group and optionally at least one further primary, secondary or tertiary amino group and/or optionally at least one ether oxygen atom, in which at least three amino groups are not arranged linearly relative to one another and in which the ratio of the number of carbon atoms present in the polyamine to the number of nitrogen atoms present in the polyamine and optionally present oxygen atoms is less than or equal to 3:1, preferably less than or equal to 2.5:1 and in particular less than or equal to 2.3:1.

Polyamines having two primary amino groups in which the ratio of the number of carbon atoms in the molecule to the number of the sum of all heteroatoms (N and O) in the molecule is less than 2.5:1, and polyamines having at least three primary amino groups in which the ratio of the number of carbon atoms in the molecule to the number of the sum of all heteroatoms (N and O) in the molecule is less than 3:1 are sufficiently polar in order to lead in step (A-i) to polymers with hydrophilic properties. If step (A-ii) is carried out, the hydrophilicity is increased further.

The polyamines having two primary amino groups and at least one secondary or tertiary amino group and/or at least one ether oxygen atom are amines in which all amino groups and all optionally present ether groups are arranged linearly relative to one another. In this connection, arranged linearly means that all amino groups and all ether oxygen atoms are arranged in the longest chain of the molecule. One preferred embodiment of such polyamines are the amines of the formula I.1 described below.

In the polyamines having at least two primary amino groups, one further primary or secondary amino group and optionally at least one further secondary or tertiary amino group and/or optionally at least one ether oxygen atom, at least three amino groups are not arranged linearly relative to one another, i.e. they preferably comprise at least one branching point from which at least three amino groups directly or indirectly branch off. One preferred example of such a nonlinear arrangement is the amines of the formula II.1 described below.

In one preferred embodiment of the invention, the amine (A-i.2) used in step (i) or (A-i) has two primary amino groups.

The amine (A-i.2) used in step (A-i) is preferably selected from amines of the formula I.1

  (I.1)

in which
each $A^1$, independently, is 1,2-ethylene, 1,3-propylene or 1,2-propylene, where if m is not 0, the number of 1,2-ethylene units $A^1$ present in the compound of the formula I to the total number of 1,3- and 1,2-propylene units $A^1$ present in the compound of the formula I is at least 1:1;
each $X^1$, independently, is O or $NR^a$;
$R^a$ is H, $C_1$-$C_4$-alkyl, $C_2$-$C_4$-hydroxyalkyl or $C_1$-$C_4$-alkoxy; and
m is a number from 0 to 100.

In one preferred embodiment, $X^1$ is O. m here is preferably a number from 2 to 100, preferably 2 to 80 and in particular 3 to 60, e.g. 3 to 50 or 3 to 20.

Examples of suitable amines in which the radical $X^1$ is O are amine-terminated polyoxyalkylenediols, for example Jeff-Amines, such as 4,9-dioxadodecane-1,12-diamine and 4,7,10-trioxamidecane-1,13-diamine, Jeff-Amines of the formula

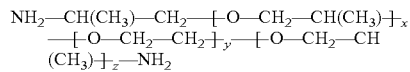

in which
y is a number from 1 to 100, preferably from 2 to 80, particularly preferably 2 to 60 and in particular 2 to 50, e.g. 2 to 40;
x and z, independently of one another, are a number from 0 to 55, preferably from 1 to 10 and in particular from 1 to 7, e.g. from 1 to 6;
where the ratio of y to the sum of x and z is at least 1.7:1, e.g. 1.7:1 to 10:1, preferably 1.7:1 to 8:1 and in particular 1.7:1 to 8:1, and the sum of x, y and z is 1 to 100, preferably 2 to 80, particularly preferably 3 to 60 and in particular 3 to 50;
or else more regular amine-terminated polyoxyalkylenepolyols, such as amine-terminated polyethylene glycols. The last-mentioned amines (amine-terminated polyethylene glycols) preferably have a molecular weight of from 200 to 3000 g/mol.

In one alternatively preferred embodiment, $X^1$ is $NR^a$. $R^a$ here is preferably H or $C_1$-$C_4$-alkyl, particularly preferably H or methyl and in particular H. Each $A^1$ here is preferably 1,2-ethylene or 1,3-propylene, with the proviso that the number of 1,2-ethylene units $A^1$ present in the compound of the formula I relative to the total number of 1,3-propylene units $A^1$ present in the compound of the formula I is at least 1:1. m here is preferably a number from 0 to 20, particularly preferably from 1 to 10, more preferably from 1 to 8 and in particular from 2 to 6, e.g. 2, 3 or 4.

Examples of suitable amines in which $X^1$ is $NR^a$ are diethylenetriamine, triethylenetetramine, tetraethylenepentamine, pentaethylenehexamine, hexaethyleneheptamine, heptaethyleneoctamine, octaethylenenonamine, higher polyethyleneimines, bis(3-aminopropyl)amine, bis(3-aminopropyl)methylamine, 3-(2-aminoethyl)aminopropylamine, N,N'-bis(3-aminopropyl)ethylenediamine, polyalkyleneimines with mixed ethylene/propylene groups as alkylene groups and the like.

Alternatively, the amine (A-i.2) used in step (A-i) is preferably selected from amines of the formula II.1

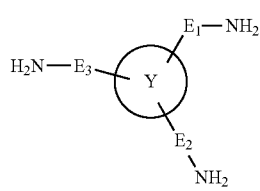

(II.1)

in which

Y is $CR^b$, N, or a 5- or 6-membered, saturated, partially unsaturated or aromatic heterocyclic ring having 1, 2 or 3 heteroatoms as ring members which are selected from N, O and S;

$E_1$, $E_2$ and $E_3$, independently of one another, are a single bond, a group -$[A^2$-$X^2]_n$-$A^2$-, —$NR^c$-$A^2$- or —O-$A^2$-, with the proviso that $E_1$, $E_2$ and $E_3$ are not a single bond and not -$NR^c$-$A^2$- when Y is N;

each $A^2$, independently, is 1,2-ethylene, 1,3-propylene or 1,2-propylene;

each $X^2$, independently, is O or $NR^d$;

$R^b$ is H, $C_1$-$C_4$-alkyl, $C_2$-$C_4$-hydroxyalkyl or $C_1$-$C_4$-alkoxy;

$R^c$ and $R^d$, independently, are H, $C_1$-$C_4$-alkyl, $C_2$-$C_4$-hydroxyalkyl or $C_1$-$C_4$-alkoxy; and n is a number from 0 to 10.

In compounds of the formula II.1, $R^b$, $R^c$ and $R^d$, independently of one another, are preferably H or $C_1$-$C_4$-alkyl, particularly preferably H or methyl and in particular H.

In compounds of the formula II.1, Y is preferably N. $E_1$, $E_2$ and $E_3$, independently of one another, are preferably a group -$[A^2$-$X^2]_n$-$A^2$-. Preferably, n is 0 here.

Examples of particularly suitable amines (A-i.2) are 1,2-ethylenediamine, 1,2-propylenediamine, 1,3-propylenediamine, diethylenetriamine, triethylenetetramine, tetraethylenepentamine, pentaethylenehexamine, hexaethyleneheptamine, heptaethyleneoctamine, octaethylenenonamine, bis(3-aminopropyl)amine, bis(3-aminopropyl)methylamine, N,N-bis(3-aminopropyl)ethylenediamine, N,N-bis(3-aminopropyl)propane-1,3-diamine, N,N-bis(3-aminopropyl)butane-1,4-diamine, tris(2-aminoethyl)amine, tris(2-aminopropyl)amine, tris(3-aminopropyl)amine, trisaminohexane, compounds of the formula I.1, in which $X^1$ is $NR^a$, where at least one $A^1$ is 1,3-propylene or 1,2-propylene, and m is a number from 1 to 100, and compounds of the formula I.1, in which $X^1$ is O and m is a number from 2 to 100.

In step (A-i), preference is given to using amines of the formula I.1, preferably those in which $X^1$ is $NR^a$, where $R^a$ is preferably H or methyl and in particular H; particular preference is given to those in which $X^1$ is $NR^a$, where $R^a$ is preferably H or methyl and in particular H, and $A^1$ is 1,2-ethylene, and in particular those in which $X^1$ is $NR^a$, where $R^a$ is preferably H or methyl and in particular H, $A^1$ is 1,2-ethylene, and m is a number from 1 to 100, preferably 1 to 20 and in particular 1 to 10, specifically 2 to 6.

In particular, in step (A-i), amines are used which are selected from diethylenetriamine, triethylenetetramine, tetraethylenepentamine, pentaethylenehexamine, hexaethylene-heptamine, heptaethyleneoctamine, octaethylenenonamine, higher polyethyleneimines, bis(3-aminopropyl)amine, bis(3-aminopropyl)methylamine, 3-(2-aminoethyl)amino-propylamine, and N,N'-bis(3-aminopropyl)ethylenediamine and more specifically amines which are selected from tetraethylenepentamine, pentaethylenehexamine, hexaethyleneheptamine, heptaethyleneoctamine and octaethylenenonamine. Specifically, in step (A-i), amines are used which are selected from diethylenetriamine, triethylenetetramine, tetraethylenepentamine, pentaethylenehexamine, hexaethylene-heptamine, heptaethyleneoctamine and octaethylenenonamine and even more specifically from triethylenetetramine, tetraethylenepentamine, pentaethylenehexamine and hexaethyleneheptamine.

Within the context of the preferred embodiment A, a hydrophilic polymer can, however, also be prepared by using any desired amine (i-2) in step (A-i) and then carrying out step (A-ii), i.e. quaternizing some of the amino groups. Suitable amines of component (i-2) are, for example, those of the above-defined formulae I, II and III.

However, in this variant of the embodiment A of the invention, in step (A-i), preference is given to using amines which are selected from 1,2-ethylenediamine, 1,2-propylenediamine, 1,3-propylenediamine, polyamines with two primary amino groups and at least one secondary or tertiary amino group and/or at least one ether oxygen atom, in which all amino groups and ether oxygen atoms are arranged linearly relative to one another and in which the ratio of the number of carbon atoms present in the polyamine to the number of nitrogen atoms present in the polyamine and optionally present oxygen atoms is less than 2.5:1, preferably less than or equal to 2.3:1 and in particular less than or equal to 2:1, and polyamines with at least two primary amino groups, at least one further primary or secondary amino group and optionally at least one further primary, secondary or tertiary amino group and/or optionally at least one ether oxygen atom, in which at least three amino groups are not arranged linearly relative to one another and in which the ratio of the number of carbon atoms present in the polyamine to the number of nitrogen atoms present in the polyamine and optionally present oxygen atoms is less than or equal to 3:1, preferably less than or equal to 2.5:1 and in particular less than or equal to 2.3:1, and polyamines of the formula IV $$NH_2\text{-}[A^3\text{-}X^3]_o\text{-}A^3\text{-}NH_2 \qquad (IV)$$

in which each $A^3$, independently, is a linear or branched $C_3$-$C_{10}$-alkylene;

$X^3$ is O or $NR^e$, preferably $NR^e$;

$R^e$ is H, $C_1$-$C_4$-alkyl, $C_2$-$C_4$-hydroxyalkyl or $C_1$-$C_4$-alkoxy; and o is a number from 0 to 100;

with the proviso that $A^3$ is linear or branched $C_4$-$C_{10}$-alkylene when o is 0.

As regards suitable and preferred polyamines having two primary amino groups and at least one secondary or tertiary amino group and/or at least one ether oxygen atom in which the ratio of the number of carbon atoms present in the polyamine to the number of nitrogen atoms present in the polyamine and optionally present oxygen atoms is less than 2.5:1, and also suitable and preferred polyamines having at least two primary amino groups, at least one further primary or secondary amino group and optionally at least one further primary, secondary or tertiary amino group and/or optionally at least one ether oxygen atom in which the ratio of the number of carbon atoms present in the polyamine to the number of nitrogen atoms present in the polyamine and optionally present oxygen atoms is less than or equal to 3:1, reference is made to the above statements.

In the polyamines of the formula IV, if o is not 0, preferably each $A^3$ independently is $C_3$-$C_4$-alkylene, in particular 1,2-propylene, 1,3-propylene or 1,4-butylene. If o is 0, $A^3$ is a linear or branched $C_4$-$C_{10}$-alkylene.

$R^e$ is preferably H or $C_1$-$C_4$-alkyl, particularly preferably H or methyl and in particular H.

Examples of suitable amines of the formula IV are 2,2-dimethyl-1,3-propanediamine, 1,4-butylenediamine, 1,5-pentylenediamine, hexamethylenediamine, heptamethylenediamine, octamethylenediamine, nonamethylenediamine, decamethylenediamine, 2,2,4- or 2,4,4-trimethyl-1,6-hexamethylenediamine, 1,5-diamino-2-methylpentane, 1,4-diamino-4-methylpentane, dipropylenetriamine, tripropylenetetramine, tetrapropylenepentamine, pentapropylenehexamine, hexapropyleneheptamine, heptapropyleneoctamine and higher polypropylenepolyamines, dibutylenetriamine, tributylenetetramine, tetrabutylenepentamine, pentabutylenehexamine, hexabutyleneheptamine, heptabutyleneoctamine and higher polybutylenepolyamines.

Particularly preferably, o is 0. Examples of suitable amines IV in which o is 0 are 2,2-dimethyl-1,3-propanediamine, 1,4-butylenediamine, 1,5-pentylenediamine, hexamethylenediamine, heptamethylenediamine, octamethylenediamine, nonamethylenediamine, decamethylenediamine, 2,2,4- or 2,4,4-trimethyl-1,6-hexamethylenediamine, 1,5-diamino-2-methylpentane and 1,4-diamino-4-methylpentane. Among these, preference is given to 1,4-butylenediamine, 1,5-pentylenediamine, hexamethylenediamine, heptamethylenediamine, octamethylenediamine, nonamethylenediamine and decamethylenediamine.

In one preferred variant of embodiment A of the invention, in step (A-i), only components (A-i.1) and (A-i.2) are condensed; i.e. components (A-i.3), (A-i.4) and (A-i.5) are not used.

In step (i) or (A-i), the molar ratio of amine (i.2) or (A-i.2) and component (i.1) or (A-i.1) is preferably selected such that the ratio of the number of primary amino groups present in the amine (i.2) or (A-i.2) to the number of primary amino groups present in component (i.1) or (A-i.1) is at least 1:1. Particularly preferably, the ratio of the number of the primary amino groups present in the amine (i.2) or (A-i.2) to the number of primary amino groups present in component (i.1) or (A-i.1) is 1:1 to 10:1, more preferably 1:1 to 5:1, e.g. 1.1:1 to 5:1 or preferably 1.2:1 to 5:1, even more 1:1 to 3:1, e.g. 1.1:1 to 3:1 or preferably 1.2:1 to 3:1 or particularly preferably 1.3:1 to 3:1, in particular 1:1 to 2:1, e.g. 1.1:1 to 2:1 or preferably 1.2:1 to 2:1 or particularly preferably 1.3:1 to 2:1, and specifically 1.5:1 to 2:1.

If component (i.3), (i.4) and/or (i.5) or component (A-i.3), (A-i.4) and/or (A-i.5) is used, then the molar ratio of all components (i.3), (i.4) and (i.5) relative to component (i.1) or of all components (A-i.3), (A-i.4) and (A-i.5) relative to component (A-i.1) is preferably 50:1 to 1:50, particularly preferably 10:1 to 1:10, more preferably 8:1 to 1:8, even more preferably 4:1 to 1:8, in particular 2:1 to 1:5 and specifically 1:1 to 1:5.

Reactions according to step (i) or (A-i) are known in principle and are described, for example, in WO 2009/080787, WO 2005/044897, WO 2005/075541, WO 03/066702 (for the use of component (i.4) or (A-i.4)) and WO 2009/021986 (for the use of component (i.5) or (A-i.5)), to which reference is hereby made in their entirety.

The preparation generally takes place by reacting the components (i.1) and (i.2) and optionally (i.3), (i.4) and/or (i.5) or the components (A-i.1) and (A-i.2) and optionally (A-i.3), (A-i.4) and/or (A-i.5) at elevated temperature.

Preferably, the reaction temperature is 40 to 300° C., particularly preferably 100 to 250° C. and in particular 150 to 230° C.

The reaction often takes place in the presence of a suitable catalyst. Suitable catalysts are Brönsted acids or Lewis acids. Suitable Brönsted acids are both inorganic acids, such as, for example, mineral acids, e.g. hydrofluoric acid, hydrochloric acid, hydrobromic acid, nitric acid, sulfuric acid, phosphoric acid or amidosulfonic acid, but also ammonium salts, such as ammonium fluoride, ammonium chloride, ammonium bromide or ammonium sulfate, and also organic acids, such as methanesulfonic acid, acetic acid, trifluoroacetic acid and p-toluenesulfonic acid. Suitable Brönsted acids are also the ammonium salts of organic amines, such as ethylamine, diethylamine, propylamine, dipropylamine, butylamine, dibutylamine, aniline, benzylamine or melamine, and also the ammonium salts of urea.

Suitable Lewis acids are all metal or semimetal halides in which the metal or semimetal has an electron pair gap. Examples thereof are $BF_3$, $BCl_3$, $BBr_3$, $AlF_3$, $AlCl_3$, $AlBr_3$, ethylaluminum dichloride, diethylaluminum chloride, $TiF_4$, $TiCl_4$, $TiBr_4$, $VCl_5$, $FeF_3$, $FeCl_3$, $FeBr_3$, $ZnF_2$, $ZnCl_2$, $ZnBr_2$, Cu(I)F, Cu(I)Cl, Cu(I)Br, Cu(II)$F_2$, Cu(II)$Cl_2$, Cu(II)$Br_2$, Sb(III)$F_3$, Sb(V)$F_5$, Sb(III)$Cl_3$, Sb(V)$Cl_5$, Nb(V)$Cl_5$, Sn(II)$F_2$, Sn(II)$Cl_2$, Sn(II)$Br_2$, Sn(IV)$F_4$, Sn(IV)$Cl_4$ and Sn(IV)$Br_4$.

However, preference is given to using Brönsted acids. Among these, preference is given to the inorganic acids and in particular the ammonium salts, such as ammonium chloride or ammonium bromide. Specifically, ammonium chloride is used.

The reaction can be carried out either at atmospheric pressure or else at increased pressure, e.g. at a pressure from 1 to 20 bar or 1 to 15 bar or 10 to 15 bar. Here, the pressure is often built up exclusively by the ammonia that is released in the course of the reaction during the condensation of components (i.1) and (i.2) or (A-i.1) and (A-i.2); i.e. the pressure increases as the reaction progresses and can then be adjusted to the desired value. If the reaction is to be carried out at increased pressure, however, the pressure can also be built up by means of an inert gas, e.g. by introducing nitrogen, argon or carbon dioxide, preferably nitrogen. This is useful particularly when the reaction is to be carried out under increased pressure from the start, i.e. before any noteworthy pressure at all can arise due to the ammonia formed. The reaction pressure is pregiven in particular by the type of amines used (component i.2 or A-i.2). Thus, the reaction can be carried out at atmospheric pressure if the at least one amine used has a boiling point which is above the reaction temperature. If, however, the boiling point is below the reaction temperature, then it is naturally advantageous to carry out the reaction at increased pressure. However, also in the case of amines with a boiling point above the reaction temperature, it may be advantageous under certain circumstances to carry out the reaction under superatmospheric pressure, for example in order to achieve a higher reaction rate.

If desired, the reaction can be carried out in a suitable solvent. Suitable solvents are inert, i.e. they do not react under the stated reaction conditions with the starting materials, intermediates or products and are themselves also not degraded under the given reaction conditions, for example through thermal decomposition. Examples of suitable solvents are chlorinated aliphatic or aromatic hydrocarbons, such as methylene chloride, chloroform, dichloroethane, trichloroethane, chlorobenzene, chlorotoluene and o-dichlorobenzene, open-chain and cyclic ethers, such as diethyl ether, dipropyl ether, tert-butyl methyl ether, tert-butyl ethyl ether, tetrahydrofuran and 1,4-dioxane, polar-aprotic solvents, such as N,N-dimethylformamide, N,N-dimethylacetamide, dimethyl sulfoxide and acetonitrile, and polar-protic solvents, e.g. polyols or polyetherpolyols, such as ethylene glycol, propylene glycol, diethylene glycol, triethylene glycol or polyethylene glycol. However, the reaction is preferably carried out without a diluent, i.e. without additional solvent. In this case, the amine of component i.2 often serves as solvent, particularly if it is liquid and is used in excess.

The reaction can be carried out by mixing all of the components and reacting them by heating to the desired reaction temperature. Alternatively, it is also possible to firstly add some of the components and to gradually add the remaining constituents, the order of the addition being of minor importance. However, it has proven useful to not completely initially introduce relatively sparingly soluble components, such as urea or melamine, but to gradually add them continuously or in portions. The individual reactants are advantageously added in such a way that their complete dissolution is ensured so that their conversion in the condensation reaction is as complete as possible.

The reaction is usually carried out in reaction vessels customary for such condensation reactions, for example in heatable stirred reactors, pressurized stirred vessels or stirred autoclaves.

The reaction mixture is generally left to react until a desired maximum viscosity has been reached. The viscosity can be determined by sample removal and determination by means of customary methods, for example using a viscometer; however, it is often evident visually in the course of the reaction when the viscosity greatly increases, for example from a foaming of the reaction mixture.

The reaction is preferably terminated when the reaction mixture has a viscosity of at most 100 000 mPas, e.g. from 250 to 100 000 mPas or from 500 to 100 000 mPas or of preferably 750 to 100 000 mPas (at 75° C.), particularly preferably of at most 50 000 mPas, e.g. from 250 to 50 000 mPas or from 500 to 50 000 mPas or from preferably 750 to 50 000 mPas (at 75° C.), and in particular from at most 25 000 mPas, e.g. from 250 to 25 000 mPas or from 500 to 25 000 mPas or from preferably 750 to 25 000 mPas (at 75° C.).

If the viscosity of the reaction mixture is not to increase further, the reaction is terminated. The reaction is preferably terminated by lowering the temperature, preferably by lowering the temperature to <100°, e.g. 20 to <100°, preferably to <50° C., e.g. to 20 to <50° C.

Under certain circumstances, it may be necessary or desirable to work-up and to purify the resulting reaction mixture. The work-up/purification can take place by means of customary methods, for example by deactivating or removing the catalyst and/or by removing solvents and unreacted starting materials. However, as a rule the degree of purity of the resulting polycondensates is adequate, meaning that it is not necessary for further work-up or purification to take place and that it is possible for the product to be passed directly to the further reaction step(s).

If component (i.4) or (A-i.4) is used and it is not a capped/blocked isocyanate, the condensation reaction has to be terminated using a termination reagent.

The focal, i.e. terminal groups of the deficit functionality (NCO group) can be stopped after reaching the desired degree of conversion and thus molecular weight either by adding a monofunctional compound that is reactive toward isocyanates, e.g. by adding a monoamine, amino alcohol or else alcohol. In this connection, preference is given to termination reagents comprising an amino group since these terminate the further reaction more rapidly than do, for example, alcohols, and thus the resulting products are better defined.

Examples of suitable monoamines are methylamine, ethylamine, propylamine, isopropylamine, n-butylamine, sec-butylamine, isobutylamine, tert-butylamine, pentylamine, hexylamine, ethanolamine, propanolamine, isopropanolamine, pentanolamine, (2-methoxyethyl)amine, (2-ethoxyethyl)amine, (3-methoxypropyl)amine, (3-ethoxypropyl)amine, [3-(2-ethylhexyl)propyl]amine, 2-(2-aminoethoxy)ethanol, cyclohexylamine, aminomethylcyclohexane, aniline, benzylamine and the like.

Furthermore, the addition of a termination compound comprising two or more than two groups that are reactive toward isocyanate is also possible. In this case, according to a convergent synthesis route, two or more polymer arms then add to the di- or polyfunctional termination compound, which leads to a sudden increase in the average molecular weight of the polymer significantly above the average molecular weight of the polymer at the point of adding the stopper.

Suitable di- or polyfunctional amines are, for example, primary amines with one or more secondary and/or tertiary amino functions, as have already been described above as (i.2) or (A-i.2), or the like.

As termination reagent, preference is given to using primary monoamines, i.e. amines with a single primary amino group and without further secondary or tertiary amino functions.

The products obtained in step (i) or (A-i) are highly branched and essentially not crosslinked.

The quaternization in the optional step (ii) or (A-ii) takes place by reacting the polymer obtained in step (i) or (A-i) with a quaternizing agent. Suitable quaternizing agents are Brönsted acids with sufficiently high acid strength to protonate secondary and tertiary amino groups, and alkylating agents. Suitable acids are, for example, mineral acids, e.g. hydrofluoric acid, hydrochloric acid, hydrobromic acid, nitric acid, sulfuric acid, phosphoric acid or amidosulfonic acid, and organic acids, such as trifluoroacetic acid and p-toluenesulfonic acid. Suitable alkylating agents are, for example, alkyl halides, such as methyl chloride, methyl bromide, methyl iodide, ethyl bromide or ethyl iodide, benzyl halides, such as benzyl chloride or benzyl bromide, dialkyl sulfates, such as dimethyl sulfate or diethyl sulfate, and oxonium salts, such as trimethyloxonium chloride, trimethyloxonium bromide, trimethyloxonium tetrafluoroborate, triethyloxonium chloride, triethyloxonium bromide and triethyloxonium tetrafluoroborate. Preferably, an alkylating agent is used for the quaternization. Preferred alkylating agents are the aforementioned alkyl halides and dialkyl sulfates.

The quaternization takes place according to customary methods by reacting the polymer obtained in step (i) or (A-i) with the quaternizing agent. The reaction generally takes place at temperatures in the range from −40 to 100° C., preferably from −20 to 50° C. and in particular at about room temperature.

The quaternization is generally carried out in a suitable solvent. Suitable solvents are inert, i.e. they do not react under the given reaction conditions with the starting materials or products. In particular, they are not themselves alkylated or protonated. Examples of solvents which are suitable for a quaternization by alkylation are chlorinated aliphatic or aromatic hydrocarbons, such as methylene chloride, chloroform, dichloroethane, trichloroethane, chlorobenzene, chlorotoluene and o-dichlorobenzene, and polar-aprotic solvents, such as N,N-dimethylformamide, N,N-dimethylacetamide or dimethyl sulfoxide. For a quaternization by means of protonation, moreover, also open-chain and cyclic ethers, such as diethyl ether, dipropyl ether, tert-butyl methyl ether, tert-butyl ethyl ether, tetrahydrofuran and 1,4-dioxane, acetonitrile, and polar-protic solvents, e.g. polyols or polyetherpolyols, such as ethylene glycol, propylene glycol, diethylene glycol, triethylene glycol or polyethylene glycol, are suitable as solvents.

The quaternizing agent is used in an amount such that some of the primary and/or secondary amino groups in the polymer present in step (i) or (A-i) are not quaternized. Preferably, in step (ii) or (A-ii), at most 80% and at least 5%, e.g. 5 to 80% or 10 to 80% or 20 to 80%, particularly preferably at most 60% and at least 5%, e.g. 5 to 60% or 10 to 60% or 20 to 60%, and in particular at most 50% and at least 5%, e.g. 5 to 50% or 10 to 50% or 20 to 50%, of the primary and secondary amino groups present in the polymer are quaternized.

Since protonation and alkylation reactions generally proceed quantitatively if the reaction time is adequate, the suitable amount of quaternizing agent is calculated by reference to the primary and secondary amino groups theoretically present in the polymer. Alternatively, the number of amine functions can be determined analytically and this can be used to calculate the amount of quaternizing agent.

When protonation/alkylation is complete, it may be necessary or desirable to work-up and purify the resulting reaction mixture. The work-up/purification can take place by means of customary methods, for example by removing solvents and unreacted starting materials. As a rule, the degree of purity of the polycondensates obtained is adequate, meaning that it is not necessary to carry out further purification and that it is possible to pass the product directly to the further reaction step(s).

In embodiment A, the at least one compound which can enter into a condensation reaction or addition reaction with amino groups of the polymer obtained in step (A-i) or (A-ii) and used in step (A-iii) is selected such that the reaction in step (A-iii) produces a lipophilic polymer segment, preferably a lipophilic shell.

Accordingly, the at least one compound used in step (A-iii) preferably has predominantly lipophilic properties.

Preferred compounds which are used in step (A-iii) are selected from aliphatic $C_4$-$C_{22}$-monocarboxylic acids or derivatives thereof;

α,β-dicarboxylic acids having at least 6 carbon atoms or derivatives thereof; aliphatic, cycloaliphatic or aromatic optionally capped isocyanates;

aliphatic monoamines having at least 6 carbon atoms;

aliphatic polyamines in which all amino groups are arranged linearly relative to one another, with a ratio of the number of carbon atoms present in the polyamine to the number of nitrogen atoms present of at least 2.5:1, preferably at least 2.7:1;

alkylene oxides having at least 3 carbon atoms;

polyetheramines of the formula V $$NH_2\text{-}[A^4\text{-}O]_p\text{-}A^4\text{-}NH_2 \quad \quad \quad (V)$$

in which each $A^4$, independently, is linear or branched $C_3$-$C_4$-alkylene; and p is a number from 1 to 5000, preferably 3 to 5000 and in particular from 10 to 5000;

ketones or aldehydes having at least 6 carbon atoms; and aldehydes in combination with at least one CH-acidic compound having at least 4 carbon atoms or with at least one hydroxyaromatic which carries at least one aliphatic radical having at least 4 carbon atoms as substituent;

where if the at least one compound used in step (A-iii) is selected from alkylene oxides having at least 3 carbon atoms, a reaction with ethylene oxide can precede the reaction with this at least one alkylene oxide.

In the latter case, the hydrophilic shell also comprises the ethylene oxide polymer block formed in the preceding step.

Aliphatic monocarboxylic acids having 4 to 22 carbon atoms are, for example, butyric acid, isobutyric acid, valeric acid, isovaleric acid, caproic acid, enanthic acid, caprylic acid, pelargonic acid, capric acid, undecanoic acid, lauric acid, tridecanoic acid, myristic acid, pentadecanoic acid, palmitic acid, margaric acid, stearic acid, nonoadecanoic acid, tuberculostearic acid, arachic acid, behenic acid, palmitoleic acid, oleic acid, erucic acid, sorbic acid, linoleic acid, linolenic acid, elaeostearic acid, arachidonic acid, clupanodonic acid and docosahexaenoic acid. Preference is given to aliphatic $C_6$-$C_{22}$-monocarboxylic acids or derivatives thereof, such as caproic acid, enanthic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid, tuberculostearic acid, arachic acid, behenic acid, palmitoleic acid, oleic acid, erucic acid, sorbic acid, linoleic acid, linolenic acid, elaeostearic acid, arachidonic acid, clupanodonic acid and docosahexaenoic acid and derivatives thereof. More preference is given to aliphatic $C_8$-$C_{22}$-monocarboxylic acids or derivatives thereof, such as caprylic acid, pelargonic acid, capric acid, undecanoic acid, lauric acid, tridecanoic acid, myristic acid, pentadecanoic acid, palmitic acid, margaric acid, stearic acid, nonadecanoic acid, tuberculostearic acid, arachic acid, behenic acid, palmitoleic acid, oleic acid, erucic acid, sorbic acid, linoleic acid, linolenic acid, elaeostearic acid, arachidonic acid, clupanodonic acid and docosahexaenoic acid and derivatives thereof. Even more preference is given to aliphatic $C_{10}$-$C_{22}$-monocarboxylic acids or derivatives thereof, such as capric acid, undecanoic acid, lauric acid, tridecanoic acid, myristic acid, pentadecanoic acid, palmitic acid, margaric acid, stearic acid, nonadecanoic acid, tuberculostearic acid, arachic acid, behenic acid, palmitoleic acid, oleic acid, erucic acid, sorbic acid, linoleic acid, linolenic acid, elaeostearic acid, arachidonic acid, clupanodonic acid and docosahexanoic acid and derivatives thereof. In particular, preference is given to aliphatic $C_{10}$-$C_{20}$-monocarboxylic acids or derivatives thereof, such as capric acid, undecanoic acid, lauric acid, tridecanoic acid, myristic acid, pentadecanoic acid, palmitic acid, margaric acid, stearic acid, nonadecanoic acid, tuberculostearic acid, arachic acid, palmitoleic acid, oleic acid, linoleic acid, linolenic acid, elaeostearic acid and arachidonic acid and derivatives thereof.

Suitable carboxylic acid derivatives are all derivatives which are suitable for reacting with the amino groups of the polymer from step (A-i) or (A-ii) to give an amide bond. These include halides, in particular acid chlorides, anhydrides and esters.

The anhydrides may be both the symmetrical anhydrides and also asymmetrical anhydrides. The latter are selected such that the "foreign" acid group can be easily displaced by the amino groups of the polymer from step (A-i) or (A-ii). Suitable acid derivatives with which the aforementioned carboxylic acids can form suitable mixed anhydrides are, for example, the esters of chloroformic acid, e.g. isopropyl chloroformate and isobutyl chloroformate, or of chloroacetic acid.

Suitable esters are, in particular, the $C_1$-$C_4$-alkyl esters, such as the methyl, ethyl, propyl, isopropyl, n-butyl, sec-butyl, isobutyl or tert-butyl esters. Also suitable, however, are esters which are derived from $C_2$-$C_6$-polyols, such as glycol, glycerol, trimethylolpropane, erythritol, pentaerythritol and sorbitol, preference being given to the glycerol ester. If polyol esters are used, then mixed esters, i.e. esters with different carboxylic acid radicals, can be used. Furthermore of suitability are active esters, which are obtained formally through the reaction of the acid with an active-ester-forming alcohol, such as p-nitrophenol, N-hydroxybenzotriazole (HOBt), N-hydroxysuccinimide or OPfp (pentafluorophenol).

Preferably, the carboxylic acids themselves (i.e. not their derivatives) are used.

The monocarboxylic acids and suitable derivatives thereof are reacted in step (A-iii) under conditions such that they form an amide bond with the amino groups of the polymer from step (A-i) or (A-ii). Suitable reaction conditions correspond to customary amide formation conditions and are described, for example, in Jerry March, Advanced Organic Chemistry, $3^{rd}$ edition, John Wiley & Sons, 1985, p. 370 ff and in the literature cited therein.

For example, the reaction generally takes place at elevated temperature, preferably from 80 to 250° C., particularly preferably from 100 to 220° C., in particular from 110 to 200° C. It is possible to allow the reaction to proceed overall at this temperature, in which case the reaction temperature is preferably 100 to 220° C. and in particular 110 to 200° C., or else alternatively to react the reactants firstly at a lower temperature, for example from 80 to 160° C., preferably from 100 to 150° C., and only then to increase the temperature further to the range stated above, e.g. to 160 to 200° C.

Preferably, during the reaction at elevated temperature, the formed water of reaction (if a carboxylic acid has been used) or the formed hydrogen halide (if an acid halide has been used), the formed alcohol (if an ester has been used) or the formed acid (if an anhydride has been used) is removed in order to increase the rate of the amidation reaction.

The reaction can take place under an inert gas stream, for example under a nitrogen stream.

The reaction can take place in the presence of a suitable solvent. Suitable solvents are those which do not adversely affect the reaction of the amino groups of the polymer and carboxylic acid (derivative). These include aromatics, such as benzene and toluene, ethers, such as diethyl ether, dipropyl ether, methyl butyl ether, tetrahydrofuran and dioxane, and chlorinated aliphatics, such as methylene chloride, chloroform, dichloroethane and the like. However, the reaction preferably takes place in the absence of a solvent.

The monocarboxylic acid or its derivative is used in step (A-iii) in an amount such that the molar ratio of the total number of primary and secondary amino groups present in the amine of component (A-i.2) to the carboxylic acid or its derivative is preferably 1:2 to 300:1, particularly preferably 1:1 to 200:1, more preferably 1:1 to 100:1, e.g. 1.5:1 to 100:1 or preferably 2:1 to 100:1 or in particular 10:1 to 100:1.

Suitable $\alpha,\beta$-dicarboxylic acids having at least 6 carbon atoms or derivatives thereof are, for example, adipic acid, pimelic acid, azelaic acid, sebacic acid, sorbic acid, polyalkylene-substituted succinic acid and derivatives thereof. Polyalkylene-substituted succinic acid is preferably polyisobutylene-substituted succinic acid which is obtainable, for example, by reacting polyisobutene with maleic anhydride under the reaction conditions of an ene reaction. The polyalkenyl radicals, specifically the polyisobutenyl radicals, here have a number-average molecular weight $M_n$ of preferably 100 to 5000, particularly preferably 200 to 1000. Among these, preference is given to $\alpha,\beta$-dicarboxylic acids having at least 10 carbon atoms or derivatives thereof, such as sebacic acid and polyalkylene-, in particular polyisobutylene-substituted, succinic acid and derivatives thereof. As regards suitable acid derivatives, reference is made to the above statements, and they are preferably not the dihalides. Preference is given to using a derivative in which the two acid groups have different reaction rates with regard to an amidation, e.g. the monoesters or the internal anhydrides (i.e. the anhydrides of the two carboxylic acid groups with one another). In this way, the formation of diamides should be suppressed as far as possible and as far as possible only monoamides should be formed. In the case of the dicarboxylic acid, particular preference is given to using the internal acid anhydrides (i.e. succinic anhydride, adipic anhydride, etc.).

The dicarboxylic acids and suitable derivatives thereof are reacted in step (A-i) under conditions such that they form an amide bond or an imide bond with the amino groups of the polymer from step (A-i) or (A-ii). As already stated, the formation of diamides should preferably be avoided as far as possible; this is engineered in particular through the choice of suitable starting materials (see above). Suitable reaction conditions correspond to customary amide formation conditions and are described, for example, in Jerry March, Advanced Organic Chemistry, $3^{rd}$ edition, John Wiley & Sons, 1985, p. 370 ff and in the literature cited therein.

For example, the reaction usually takes place at elevated temperature, preferably from 80 to 250° C., particularly preferably from 100 to 220° C., in particular from 110 to 200° C. It is possible to allow the reaction to proceed at this temperature overall, in which case the reaction temperature is preferably 100 to 220° C. and in particular 110 to 200° C., or else to alternatively react the reactants firstly at a lower temperature, for example from 80 to 160° C., preferably from 100 to 150° C., and only then to increase the temperature further to the range stated above, e.g. to 160 to 200° C.

Preferably, during the reaction at elevated temperature, the formed reaction water (if a carboxylic acid has been used) or the formed hydrogen halide (if an acid halide has been used), the formed alcohol (if an ester has been used) or the formed acid (if an anhydride has been used) is removed in order to increase the rate of the amidation reaction.

The reaction can take place under an inert gas stream, for example under a nitrogen stream.

The reaction can take place in the presence of a suitable solvent. Suitable solvents are those which do not adversely affect the reaction of the amino groups of the polymer and carboxylic acid (derivative). These include aromatics, such as benzene and toluene, ethers, such as diethyl ether, dipropyl ether, methyl butyl ether, tetrahydrofuran and dioxane, and chlorinated aliphatics, such as methylene chloride, chloroform, dichloroethane and the like. Preferably, however, the reaction takes place in the absence of a solvent.

The dicarboxylic acid or its derivative is used in step (A-iii) in an amount such that the molar ratio of the total number of primary and secondary amino groups present in the amine of component (A-i.2) to the carboxylic acid or its derivative is preferably 1:2 to 300:1, particularly preferably 1:1 to 200:1, more preferably 1:1 to 100:1, e.g. 1.5:1 to 100:1, or preferably 2:1 to 100:1 or specifically 10:1 to 100:1.

Suitable aliphatic, cycloaliphatic or aromatic optionally capped isocyanates are, for example, butyl isocyanate, pentyl isocyanate, hexyl isocyanate, cyclohexyl isocyanate, phenyl isocyanate and the like.

The aliphatic, cycloaliphatic or aromatic optionally capped isocyanates are reacted in step (A-iii) under conditions such that they form a urea group with the amino groups of the polymer from step (A-i) or (A-ii). Suitable reaction conditions correspond to customary conditions for the addition of amines onto isocyanates and are described, for example, in Jerry March, Advanced Organic Chemistry, $3^{rd}$ edition, John Wiley & Sons, 1985, p. 802 ff and in the literature cited therein.

The isocyanates are used in step (A-iii) in an amount such that the molar ratio of the total number of primary and secondary amino groups present in the amine of component (A-i.2) to the isocyanate is preferably 1:2 to 300:1, particularly preferably 1:1 to 200:1, more preferably 1:1 to 100:1, e.g. 1.5:1 to 100:1, or preferably 2:1 to 100:1 or specifically 10:1 to 100:1.

Suitable aliphatic monoamines having at least 6 carbon atoms are preferably primary or secondary, particularly preferably primary. Examples thereof are hexylamine, heptylamine, octylamine, nonylamine, decylamine, dodecylamine, [3-(2-ethylhexyl)propyl]amine and the like.

Suitable aliphatic polyamines with a ratio of the number of carbon atoms present in the polyamine to the number of nitrogen atoms present of at least 2.5:1 are, for example, pentamethylenediamine, hexamethylenediamine, heptamethylenediamine, octamethylenediamine, nonamethylenediamine, decamethylenediamine, polybutylenepolyamines, polypentylenepolyamines and the like.

The mono- or polyamines are reacted in step (A-iii) under conditions such that they react with the amino groups of the polymer from step (A-i) or (A-ii) with displacement of ammonia or of an amine in an $S_n$ reaction.

The mono-/polyamines are used in step (A-iii) in an amount such that the molar ratio of the total number of primary and secondary amino groups present in the amine of component (A-i.2) to the mono-/polyamine is preferably 1:2 to 300:1, particularly preferably 1:1 to 200:1, more preferably 1:1 to 100:1, e.g. 1.5:1 to 100:1, or preferably 2:1 to 100:1 or specifically 10:1 to 100:1.

Suitable alkylene oxides having at least 3 carbon atoms are, for example, propylene oxide, butylene oxide, pentylene oxide, styrene oxide and the like. Among these, preference is given to propylene oxide, butylene oxide, pentylene oxide. More preference is given to propylene oxide and butylene oxide. In particular, propylene oxide is used.

The alkylene oxides are reacted in step (A-iii) under conditions such that they add onto amino groups of the polymer from step (A-i) or (A-ii) and form polyetherol groups.

The alkylene oxides are used in step (A-iii) in an amount such that the molar ratio of the total number of primary, secondary and tertiary amino groups present in the amine of component (A-i.2) to the alkylene oxide is preferably 1:1 to 1:500, particularly preferably 1:1 to 1:300, more preferably 1:2 to 1:200, even more preferably 1:3 to 1:100 and in particular 1:3 to 1:50.

The reaction with alkylene oxides can take place analogously to known alkoxylation processes. Thus, for example, the product obtained in step (A-i) or (A-ii) can be reacted in a first step only with some of the total alkylene oxide intended for the alkoxylation, e.g. with about 1 mol of alkylene oxide per mole of primary, secondary and tertiary amino groups of the amine of component (A-i.2). This first step can be carried out without catalyst. The reaction generally takes place in aqueous solution. The reaction temperature is generally 70 to 200° C. and preferably 80 to 160° C. Since most alkylene oxides are gaseous at these reaction temperatures, the reaction is generally carried out at superatmospheric pressure, e.g. at >1 to 10 bar, preferably at >1 to 8 bar. In a second step, the reaction takes place with the remaining alkylene oxide. This reaction is preferably carried out in the presence of a suitable catalyst. Suitable catalysts are bases, e.g. alkali metal hydroxides, such as sodium hydroxide or potassium hydroxide, alkaline earth metal hydroxides, such as calcium hydroxide or magnesium hydroxide, alkali metal alkoxides, such as sodium methanolate, sodium ethanolate or potassium tert-butoxide, alkali metal hydrides, such as lithium hydride or sodium hydride, alkaline earth metal hydrides, such as calcium hydride, and alkali metal carbonates, such as sodium carbonate. Among these, preference is given to the specified alkali metal hydroxides and alkoxides. Specifically, sodium hydroxide or potassium hydroxide are used. The basic catalyst is used in an amount of preferably 0.05 to 10% by weight, particularly preferably 0.5 to 2% by weight, based on the total amount of used polymer and alkylene oxide. The second alkoxylation step can be carried out without a diluent or in a suitable solvent. Suitable solvents for this step are in particular aprotic organic solvents, e.g. polar-aprotic solvents, such as ethers, in particular cyclic ethers, such as tetrahydrofuran and dioxane, amides, such as N,N-dimethylformamide and N,N-dimethylacetamide, and lactams, such as N-methylpyrrolidone, or nonpolar solvents, e.g. aliphatic hydrocarbons, such as pentane, hexane and heptane, cycloaliphatic hydrocarbons, such as cyclohexane, and aromatic hydrocarbons, such as benzene, toluene and the xylenes. Also suitable are mixtures of said solvents. Preference is given to using toluene or xylene. For both procedures, it is necessary to firstly remove the water used as solvent in the first step, which can take place, for example, by distillation. Otherwise, the alkoxylation is generally carried out as described for the first step.

If a reaction with ethylene oxide also precedes the reaction with the at least one alkylene oxide having at least 3 carbon atoms, so that the hydrophilic core is expanded by one ethylene oxide polymer block, the reaction with ethylene oxide takes place analogously to the procedure described above.

Suitable polyetheramines of the formula V are, for example, amine-terminated polypropylene glycol ethers (NH$_2$—[—(CH$_2$)$_3$—O—]$_p$—(CH$_2$)$_3$—NH$_2$; NH$_2$—[ (CH$_2$—CH(CH$_3$)—O—]$_p$—(CH$_2$—CH(CH$_3$)—NH$_2$) and amine-terminated polytetrahydrofurans (NH$_2$—[ (CH$_2$)$_4$—O—]$_p$—(CH$_2$)$_4$—NH$_2$) with a molecular weight of 200 to 360 000.

The polyetheramines of the formula V are reacted in step (A-iii) under conditions such that they react with the amino groups of the polymer from step (A-i) or (A-ii) with displacement of ammonia or of an amine in an S$_n$ reaction.

The polyetheramines are used in step (A-iii) in an amount such that the molar ratio of the total number of primary and secondary amino groups present in the amine of component (A-i.2) to the polyetheramine is preferably 1:2 to 300:1, particularly preferably 1:1 to 200:1, more preferably 1:1 to 100:1, e.g. 1.5:1 to 100:1, or preferably 2:1 to 100:1 or specifically 10:1 to 100:1.

Suitable ketones or aldehydes having at least 6 carbon atoms are, for example, hexanal, heptanal, octanal, nonanal, decanal, benzaldehyde, methyl butyl ketone, cyclohexanone, benzophenone and the like.

The ketones or aldehydes are reacted in step (A-iii) under conditions such that they react with the amino groups of the polymer from step (A-i) or (A-ii) with the formation of azomethine or enamine.

The ketones/aldehydes are used in step (A-iii) in an amount such that the molar ratio of total number of the of the primary and secondary amino groups present in the amine of component (A-i.2) to the ketone/aldehyde is preferably 1:2 to 300:1, particularly preferably 1:1 to 200:1, more preferably 1:1 to 100:1, e.g. 1.5:1 to 100:1, or preferably 2:1 to 100:1 or specifically 10:1 to 100:1.

Suitable aldehydes which, in combination with at least one CH-acidic compound having at least 4 carbon atoms or with at least one hydroxyaromatic which carries at least one aliphatic radical having at least 4 carbon atoms as substituents are those which can enter into a Mannich reaction with the amino groups of the polymer from step (i) or (ii). The aldehyde used is preferably formaldehyde. Suitable CH-acidic compounds are, for example, butanal, pentanal, hexanal and the like. Suitable hydroxyaromatics are, for example, butylphenol, such as 2- or 4-butylphenol, tert-butylphenol, such as 4-tert-butylphenol, and polyalkenyl-substituted phenol, such as polyisobutyl (PIB)-substituted phenols, for example those which have a PIB radical with a number-average molecular weight M$_n$ of 100 to 5000, e.g. 200 to 1000.

The aldehyde in combination with at least one CH-acidic compound having at least 4 carbon atoms or with at least one hydroxyaromatic which carries at least one aliphatic radical having at least 4 carbon atoms as substituent is reacted in step (A-iii) under conditions such that these react with the amino groups of the polymer from step (A-i) or (A-ii) in a Mannich reaction. Suitable reaction conditions correspond to customary conditions for the Mannich reaction and are described, for example, in Jerry March, Advanced Organic Chemistry, 3rd edition, John Wiley & Sons, 1985, p. 800 ff and in the literature cited therein.

Particularly preferably, the at least one compound used in step (A-iii) is selected from aliphatic C$_{10}$-C$_{22}$-monocarboxylic acids or derivatives thereof and α,β-dicarboxylic acids having at least 10 carbon atoms.

If step (A-ii) has not been carried out, step (A-iii), if the hydrophilicity of the internal shell is to be increased further, can also be followed by step (A-iv). However, this optional quaternization step is of course only contemplated if the lipophilic shell introduced in step (A-iii) comprises no quaternizable groups since otherwise this shell would lose or at least reduce its lipophilicity. In particular, in step (A-iii), no diamine, polyamine or polyetheramine must be used; no Mannich reaction must take place and the other compounds used (mono/dicarboxylic acids, isocyanates, aldehydes/ketones etc.) must also comprise no amino groups. As regards suitable quaternizing agents and conditions, reference is made to the above statements relating to step (A-ii).

Preferred Embodiment B of The Invention

In this embodiment, a lipophilic polymer is prepared in step (i) or in the optional step (ii).

Accordingly, a preferred embodiment of the invention relates to a process B, comprising the following steps:

(B-i) condensation of
  (B-i.1) melamine and optionally at least one melamine derivative with
  (B-i.2) at least one amine different therefrom having at least two primary amino groups;
  and optionally moreover also with
  (B-i.3) urea and/or at least one urea derivative; and/or
  (B-i.4) at least one at least difunctional di- or polyisocyanate; and/or
  (B-i.5) at least one carboxylic acid having at least two carboxyl groups or at least one derivative thereof;
where a hydrophobic polymer segment is obtained in step (B-i); and
(B-iii) reacting the hydrophobic polymer segment obtained in step (B-i) with at least one compound which can enter into a condensation reaction or addition reaction with amino groups and which leads to the formation of a hydrophilic polymer segment, the compound being selected from aliphatic polyamines, amine-terminated polyethers and ethylene oxide, where the reaction with ethylene oxide can be preceded by a reaction with another alkylene oxide.

For this purpose, the at least one amine (B-i.2) different from melamine or the melamine derivative and used in step (B-i) is preferably selected from
  diamines of the formula VI

in which A$^5$ is a divalent aliphatic, alicyclic, aliphatic-alicyclic, aromatic or araliphatic radical, where the aliphatic and the alicyclic radical have at least 4 carbon atoms; and
  polyamines having two primary amino groups and at least one secondary or tertiary amino group and/or at least one ether oxygen atom, in which all amino groups and ether oxygen atoms are arranged linearly relative to one another and in which the ratio of the number of carbon atoms present in the polyamine to the number of nitrogen atoms present and optionally present oxygen atoms is at least 2.5:1, preferably at least 2.7:1.

In this embodiment B, the process according to the invention obviously does not comprise step (ii).

As already explained, divalent aliphatic radicals are those which comprise no cycloaliphatic, aromatic or heterocyclic constituents. Examples are alkylene, alkenylene and alkynylene radicals.

In one preferred embodiment, the divalent aliphatic radical A$^5$ is linear or branched C$_4$-C$_{20}$-alkylene, particularly preferably linear or branched C$_4$-C$_{10}$-alkylene, more preferably linear or branched $C_5$-$C_{10}$-alkylene and in particular linear or branched $C_6$-$C_8$-alkylene.

Examples of suitable amines in which the radical $A^5$ has this meaning ($C_4$-$C_{20}$-alkylene) are 2,2-dimethyl-1,3-propanediamine, 1,4-butylenediamine, 1,5-pentylenediamine, hexamethylenediamine, heptamethylenediamine, octamethylenediamine, nonamethylenediamine, decamethylenediamine, undecamethylenediamine, dodecamethylenediamine, tridecamethylenediamine, tetradecamethylenediamine, pentadecamethylenediamine, hexadecamethylenediamine, heptadecamethylenediamine, octadecamethylenediamine, nonadecamethylenediamine, eicosamethylenediamine, 2-butyl-2-ethyl-1,5-pentamethylenediamine, 2,2,4- or 2,4,4-trimethyl-1,6-hexamethylenediamine, 1,5-diamino-2-methylpentane, 1,4-diamino-4-methylpentane and the like.

Among these, particular preference is given to amines in which $A^5$ is linear or branched $C_4$-$C_{10}$-alkylene, as in 2,2-dimethyl-1,3-propanediamine, 1,4-butylenediamine, 1,5-pentylenediamine, hexamethylenediamine, heptamethylenediamine, octamethylenediamine, nonamethylenediamine, decamethylenediamine, 2,2,4- or 2,4,4-trimethyl-1,6-hexamethylenediamine, 1,5-diamino-2-methylpentane, 1,4-diamino-4-methylpentane and the like.

Among these, more preference is given to amines in which $A^5$ is linear or branched $C_5$-$C_{10}$-alkylene, as in 2,2-dimethyl-1,3-propanediamine, 1,5-pentylenediamine, hexamethylenediamine, heptamethylenediamine, octamethylenediamine, nonamethylenediamine, decamethylenediamine, 2,2,4- or 2,4,4-trimethyl-1,6-hexamethylenediamine, 1,5-diamino-2-methylpentane, 1,4-diamino-4-methylpentane and the like.

In particular, among these, preference is given to amines in which $A^5$ is linear or branched $C_6$-$C_8$-alkylene, as in hexamethylenediamine, heptamethylenediamine, octamethylenediamine, 1,5-diamino-2-methylpentane, 1,4-diamino-4-methylpentane and the like. In one specific embodiment, amines are used in which A is linear $C_6$-$C_8$-alkylene. Examples of such amines are hexamethylenediamine, heptamethylenediamine and octamethylenediamine.

As already explained, divalent alicyclic radicals can comprise one or more, e.g. one or two, alicyclic radicals; however, they do not comprise aromatic or heterocyclic constituents. The alicyclic radicals may be substituted by aliphatic radicals, but in this case bonding sites for the $NH_2$ groups are located on the alicyclic radical.

In one preferred embodiment, the divalent alicyclic radicals $A^5$ are selected from $C_5$-$C_8$-cycloalkylene which can carry 1, 2, 3 or 4 $C_1$-$C_4$-alkyl radicals. Examples of suitable amines in which the radical $A^5$ has this meaning are cyclopentylenediamine, such as 1,2-diaminocyclopentane or 1,3-diaminocyclopentane, cyclohexylenediamine, such as 1,2-diaminocyclohexane, 1,3-diaminocyclohexane or 1,4-diaminocyclohexane, 1-methyl-2,4-diaminocyclohexane, 1-methyl-2,6-diaminocyclohexane, cycloheptylenediamine, such as 1,2-diaminocycloheptane, 1,3-diaminocycloheptane or 1,4-diaminocycloheptane, and cyclooctylenediamine, such as 1,2-diaminocyclooctane, 1,3-diaminocyclooctane, 1,4-diaminocyclooctane or 1,5-diaminocyclooctane. The amino groups ($NH_2$ groups) may be in the cis or trans position relative to one another.

As already explained, divalent aliphatic-alicyclic radicals comprise both at least one divalent aliphatic and also at least one divalent alicyclic radical, it being possible for the two bonding sites for the $NH_2$ groups to be located either both on the alicyclic radical(s) or both on the aliphatic radical(s), or one on an aliphatic radical and the other on an alicyclic radical.

In one preferred embodiment, the divalent aliphatic-alicyclic radicals $A^5$ are selected from $C_5$-$C_8$-cycloalkylene-$C_1$-$C_4$-alkylene, $C_5$-$C_8$-cycloalkylene-$C_1$-$C_4$-alkylene-$C_5$-$C_8$-cycloalkylene and $C_1$-$C_4$-alkylene-$C_5$-$C_8$-cycloalkylene-$C_1$-$C_4$-alkylene, where the cycloalkylene radicals can carry 1, 2, 3 or 4 $C_1$-$C_4$-alkyl radicals. Examples of suitable amines in which the radical $A^5$ has this meaning are diaminodicyclohexylmethane, isophoronediamine, bis(aminomethyl)cyclohexane, such as 1,1-bis(amino-methyl)cyclohexane, 1,2-bis(aminomethyl)cyclohexane, 1,3-bis(aminomethyl)cyclo-hexane or 1,4-bis(aminomethyl)cyclohexane, 2-aminopropylcyclohexylamine, 3(4)-aminomethyl-1-methylcyclohexylamine and the like. The groups bonded to the alicyclic radical can assume any desired position (cis/trans) relative to one another.

As already explained, divalent aromatic radicals can comprise one or more, e.g. one or two, aromatic radicals; however, they comprise no alicyclic or heterocyclic constituents. The aromatic radicals may be substituted by aliphatic radicals, but in this case both bonding sites for the $NH_2$ groups are located on the aromatic radical(s).

In one preferred embodiment, the divalent aromatic radicals $A^5$ are selected from phenylene, biphenylene, naphthylene, phenylene-sulfone-phenylene and phenylene-carbonyl-phenylene, where the phenylene and naphthylene radicals can carry 1, 2, 3 or 4 $C_1$-$C_4$-alkyl radicals. Examples of suitable amines in which the radical $A^5$ has this meaning are phenylenediamine, such as o-, m- and p-phenylenediamine, tolylenediamine, such as o-, m- and p-tolylenediamine, xylylenediamine, naphthylenediamine, such as 1,2-, 1,3-, 1,4-, 1,5-, 1,8-, 2,3-, 2,6- and 2,7-naphthylene, diaminodiphenylsulfone, such as 2,2'-, 3,3'- and 4,4'-diaminodiphenylsulfone, and diaminobenzophenone, such as 2,2'-, 3,3'- and 4,4'-diaminobenzophenone.

As already explained, divalent araliphatic radicals comprise both at least one divalent aliphatic and also at least one divalent aromatic radical, it being possible for the two bonding sites for the $NH_2$ groups to be located either both on the aromatic radical(s) or both on the aliphatic radical(s) or one on an aliphatic radical and the other on an aromatic radical.

In one preferred embodiment, the divalent araliphatic radicals $A^5$ are selected from phenylene-$C_1$-$C_4$-alkylene and phenylene-$C_1$-$C_4$-alkylenephenylene, where the phenylene radicals can carry 1, 2, 3 or 4 $C_1$-$C_4$-alkyl radicals. Examples of suitable amines in which the radical $A^5$ has this meaning are diaminodiphenylmethane, such as 2,2'-, 3,3'- and 4,4'-diaminodiphenylmethane, and the like.

Preferably, in amines of the formula VI, $A^5$ is a divalent aliphatic radical, where the aliphatic radical has at least 4 carbon atoms, preferably at least 5 and in particular at least 6 carbon atoms. Preferably, the aliphatic radical is linear or branched $C_4$-$C_{20}$-alkylene, particularly preferably linear or branched $C_4$-$C_{10}$-alkylene, more preferably linear or branched $C_5$-$C_{10}$-alkylene and in particular linear or branched $C_6$-$C_8$-alkylene.

In the polyamines with two primary amino groups and at least one further secondary or tertiary amino group and/or at least one ether oxygen atom, in which the ratio of the number of carbon atoms present in the polyamine to the number of nitrogen atoms present and optionally present oxygen atoms is at least 2.5:1, all amino groups and all optionally present ether groups are arranged linearly relative to one another: in this connection, arranged linearly means that all amino groups and all ether oxygen atoms are located in the longest chain of the molecule. Examples thereof are polypropylenepolyamines, polybutylenepolyamines, amine-terminated polypropylene glycols and amine-terminated polybutylene glycols.

In one preferred embodiment of variant B, the amine (B-i.2) used in step (B-i) has two primary amino groups.

Particularly preferably, the amine (B-i.2) used in step (B-i) is selected from
amines of formula (VI.1)

in which
$A^{5a}$ is a linear or branched alkylene group having at least 5, preferably at least 6, carbon atoms; and
polyetheramines of the formula VII

in which
each $A^6$, independently, is linear or branched $C_3$-$C_4$-alkylene; and
q is a number from 1 to 5000, preferably 3 to 5000, particularly preferably 5 to 5000 and in particular 10 to 5000.

Preferably, $A^{5a}$ is linear or branched $C_5$-$C_{20}$-alkylene, particularly preferably linear or branched $C_5$-$C_{10}$-alkylene, more preferably linear or branched $C_6$-$C_{10}$-alkylene and in particular linear or branched $C_6$-$C_8$-alkylene.

Examples of suitable amines in which the radical Ma has this meaning ($C_5$-$C_{20}$-alkylene) are 2,2-dimethyl-1,3-propanediamine, 1,5-pentylenediamine, hexamethylenediamine, heptamethylenediamine, octamethylenediamine, nonamethylenediamine, decamethylenediamine, undecamethylenediamine, dodecamethylenediamine, tridecamethylenediamine, tetradecamethylenediamine, pentadecamethylenediamine, hexadecamethylenediamine, heptadecamethylenediamine, octadecamethylenediamine, nonadecamethylenediamine, eicosamethylenediamine, 2-butyl-2-ethyl-1,5-pentamethylenediamine, 2,2,4- or 2,4,4-trimethyl-1,6-hexamethylenediamine, 1,5-diamino-2-methylpentane, 1,4-diamino-4-methylpentane and the like.

Among these, particular preference is given to amines in which $A^{5a}$ is linear or branched $C_5$-$C_{10}$-alkylene, as in 2,2-dimethyl-1,3-propanediamine, 1,5-pentylenediamine, hexamethylenediamine, heptamethylenediamine, octamethylenediamine, nonamethylenediamine, decamethylenediamine, 2,2,4- or 2,4,4-trimethyl-1,6-hexamethylenediamine, 1,5-diamino-2-methylpentane, 1,4-diamino-4-methylpentane and the like.

Among these, more preference is given to amines in which $A^{5a}$ is linear or branched $C_6$-$C_{10}$-alkylene, as in hexamethylenediamine, heptamethylenediamine, octamethylenediamine, nonamethylenediamine, decamethylenediamine, 2,2,4- or 2,4,4-trimethyl-1,6-hexamethylenediamine, 1,5-diamino-2-methylpentane, 1,4-diamino-4-methylpentane and the like.

Among these, particular preference is given to amines in which $A^{5a}$ is linear or branched $C_6$-$C_8$-alkylene, as in hexamethylenediamine, heptamethylenediamine, octamethylenediamine, 1,5-diamino-2-methylpentane, 1,4-diamino-4-methylpentane and the like. In one specific embodiment, amines are used in which A is linear $C_6$-$C_8$-alkylene. Examples of such amines are hexamethylenediamine, heptamethylenediamine and octamethylenediamine.

Polyetheramines of the formula VII are, for example, amine-terminated polypropylene glycols and amine-terminated polybutylene glycols with a molecular weight of from 240 to 360 000.

In one preferred variant of embodiment B of the invention, in step (B-i), only components (B-i.1) and (B-i.2) are condensed; i.e. components (B-i.3), (B-i.4) and (B-i.5) are not used.

In step (B-i), the molar ratio of amine (B-i.2) and component (B-i.1) is preferably selected such that the ratio of the number of primary amino groups present in the amine (B-i.2) to the number of primary amino groups present in component (B-i.1) is at least 1:1. Particularly preferably, the ratio of the number of primary amino groups present in the amine (B-i.2) to the number of primary amino groups present in component (B-i.1) is 1:1 to 10:1, e.g. 1.1:1 to 10:1, more preferably 1:1 to 5:1, e.g. 1.1:1 to 5:1, preferably 1.2:1 to 5:1; even more preferably 1:1 to 3:1, e.g. 1.1:1 to 3:1 or preferably 1.2:1 to 3:1 or particularly preferably 1.3:1 to 3:1; specifically 1:1 to 2:1, e.g. 1.1:1 to 2:1 or preferably 1.2:1 to 2:1 or particularly preferably 1.3:1 to 2:1 or in particular 1.4:1 to 2:1.

If component (B-i.3), (B-i.4) and/or (B-i.5) is used, then the molar ratio of all components (B-i.3), (B-i.4) and (B-i.5) to component (B-i.1) is preferably 50:1 to 1:50, particularly preferably 10:1 to 1:10, more preferably 8:1 to 1:8, even more preferably 4:1 to 1:8, in particular 2:1 to 1:5 and specifically 1:1 to 1:5.

As regards the process measures for the reaction in step (B-i), reference is made to that stated for embodiment A.

In embodiment B, the at least one compound which can enter into a condensation reaction or addition reaction amino groups of the polymer obtained in step (B-i) or (B-ii) and used in step (B-iii) is preferably selected such that a hydrophilic polymer segment, preferably a hydrophilic shell, is formed by the reaction in step (B-iii).

Accordingly, the at least one compound used in step (B-iii) preferably has predominantly hydrophilic properties.

Preferred compounds which are used in step (B-iii) are selected from
polyamines with two primary amino groups and at least one secondary or tertiary amino group and/or at least one ether oxygen atom, in which all amino groups and ether oxygen atoms are arranged linearly relative to one another and in which the ratio of the number of carbon atoms present in the polyamine to the number of nitrogen atoms present and optionally present oxygen atoms is less than or equal to 2.5:1, preferably less than or equal to 2.3:1 and in particular less than or equal to 2:1; and
ethylene oxide;
where, if the at least one compound used in step (B-iii) is ethylene oxide, a reaction with at least one alkylene oxide having at least 3 carbon atoms can precede the reaction with ethylene oxide.

In the latter case, the lipophilic shell also comprises the alkylene oxide polymer block formed in the preceding step.

Suitable and preferred polyamines with two primary amino groups and at least one secondary or tertiary amino group and/or at least one ether oxygen atom, in which all amino groups and ether oxygen atoms are arranged linearly relative to one another and in which the ratio of the number of carbon atoms present in the polyamine to the number of nitrogen atoms present and optionally present oxygen atoms is less than or equal to 2.5:1, correspond to those which are described as suitable and preferred in embodiment A in connection with step (A-i).

The polyamines are reacted in step (B-iii) under conditions such that they react with the amino groups of the polymer from step (B-i) or (B-ii) with displacement of ammonia or of an amine in an $S_n$ reaction.

Ethylene oxide is reacted in step (B-iii) under conditions such that it adds onto amino groups of the polymer from step (B-i) or (B-ii) and forms polyetherol groups.

If a reaction with the at least one alkylene oxide having at least 3 carbon atoms also precedes the reaction with ethylene oxide such that the lipophilic core is expanded by a polymer block from the alkylene oxide having at least 3 carbon atoms, the reaction with the alkylene oxide takes place analogously to the procedure described above.

Suitable alkylene oxides having at least 3 carbon atoms are, for example, propylene oxide, butylene oxide, pentylene oxide, styrene oxide and the like. Among these, preference is given to propylene oxide, butylene oxide, pentylene oxide. More preference is given to propylene oxide and butylene oxide. In particular, propylene oxide is used.

Particular preference is given to using ethylene oxide in step (B-iii). Specifically, a reaction with at least one of the aforesaid alkylene oxides precedes the reaction with ethylene oxide.

The hydrophilic polymer segments formed in step (B-iii) may be hydrophilicized even more if, following the reaction according to step (B-iii), at least some of the secondary and/or primary amino groups present in the resulting polymer are quaternized and/or reacted with ethylene oxide (the latter of course only applies if ethylene oxide has not already been used in step (B-iii)). However, this only makes sense if a diamine (i.e. not a polyamine and also not an amine-terminated polyether) has been used in step (B-i) as amine (B-i.2).

As regards suitable and preferred quaternizing agents and suitable process measures, reference is made to the statements made in respect of embodiment A regarding step (A-ii).

For the further derivatization, in particular for further increasing the hydrophilicity, it is possible, alternatively or additionally following the reaction according to step (B-iii), to convert at least some of the secondary and/or primary amino groups present in the resulting polymer into a carbobetaine group, sulfobetaine group and/or phosphobetaine group. This measure too only makes sense when a diamine (i.e. not a polyamine and also not an amine-terminated polyether) has been used in step (B-i) as amine (B-i.2).

If ethylene oxide has been used in step (B-iii), then for the further hydrophilicization, the polymer obtained following reaction according to step (B-iii) can be terminated with a sulfate group or phosphate group.

The sulfation of the polymer obtained in step (B-iii) (more precisely the terminal alcohol groups of the polyethylene glycol segments) can take place by its reaction with a sulfating agent.

Suitable sulfating agents are, for example, sulfuric acid (preferably 75 to 100% strength, particularly preferably 85 to 98% strength sulfuric acid), oleum, $SO_3$, chlorosulfonic acid, sulfuryl chloride, amidosulfonic acid and the like. If sulfuryl chloride is used, then the second chlorine atom must be removed hydrolytically after the sulfation reaction.

The sulfating agent is in most cases used in an equimolar amount or in a slight excess (e.g. 1 to 1.5 mol per mole of OH groups in the polymer); however, depending on the desired degree of hydrophilicization, it may also be used in deficit.

The sulfation can take place in the presence of a solvent or an entrainer, such as toluene.

To convert the sulfuric acid half-ester initially obtained by the sulfation into sulfate groups, the sulfated polymer is neutralized with a suitable base. Suitable bases are, for example, inorganic bases, e.g. alkali metal hydroxides, such as lithium hydroxide, sodium hydroxide or potassium hydroxide, alkaline earth metal hydroxides, such as calcium hydroxide or magnesium hydroxide, alkali metal carbonates, such as lithium carbonate, sodium carbonate or potassium carbonate, alkaline earth metal carbonates, such as calcium carbonate or magnesium carbonate, alkali metal hydrogencarbonates, such as lithium hydrogencarbonate, sodium hydrogencarbonate or potassium hydrogencarbonate, or alkaline earth metal hydrogencarbonates, such as calcium hydrogencarbonate or magnesium hydrogencarbonate, but also a number of organic bases, e.g. alkali metal alcoholates, such as sodium methanolate, potassium methanolate, sodium ethanolate, potassium methanolate, sodium butylate and potassium tert-butylate.

However, it is also possible to insert a sulfate group via a transsulfation. For this, the polymer (more precisely the amino functions) obtained in step (B-iii) is quaternized with dimethyl sulfate or diethyl sulfate. The counteranion (anion of the sulfuric acid half-ester, metosulfate) is then transesterified with the terminal alcohol groups of the polyethylene glycol segments with elimination of methanol or ethanol. If required, the conversion of the sulfuric acid half-ester to sulfate groups can take place as described previously.

The phosphation of the polymer (more precisely of the terminal alcohol groups of the polyethylene glycol segments) obtained in step (B-iii) can take place by its reaction with a phosphating agent.

Suitable phosphating agents are, for example, phosphoric acid, polyphosphoric acid, phosphorus pentoxide, $POCl_3$ and the like. If $POCl_3$ is used, then the second chlorine atom must be removed hydrolytically after the phosphation reaction.

The phosphating agent is used in most cases in an equimolar amount or in a slight excess (e.g. 1 to 1.5 mol per mole of OH groups in the polymer); however, depending on the desired degree of hydrophilicization, it can also be used in deficit.

To convert the phosphoric acid half-ester initially obtained by the phosphation into phosphate groups, the phosphated polymer is neutralized with a suitable base. Suitable bases are, for example, inorganic bases, e.g. alkali metal hydroxides, such as lithium hydroxide, sodium hydroxide or potassium hydroxide, alkaline earth metal hydroxides, such as calcium hydroxide or magnesium hydroxide, alkali metal carbonates, such as lithium carbonate, sodium carbonate or potassium carbonate, alkaline earth metal carbonates, such as calcium carbonate or magnesium carbonate, alkali metal hydrogencarbonates, such as lithium hydrogencarbonate, sodium hydrogencarbonate or potassium hydrogencarbonate, or alkaline earth metal hydrogencarbonates, such as calcium hydrogencarbonate or magnesium hydrogencarbonate, but also a number of organic bases, e.g. alkali metal alcoholates, such as sodium methanolate, potassium methanolate, sodium methanolate, potassium methanolate, sodium butylate and potassium tert-butylate.

The invention further provides functionalized highly branched melamine-polyamine polymers which are obtainable by the process according to the invention.

As regards the properties of the polymers according to the invention, reference is made to the above statements.

The invention further provides the use of the polymers according to the invention as surface-active agents and/or for the surface modification of organic or inorganic material.

Surface-active agents (also called interface-active agents) are substances which bring about the reduction in the surface tension of a material, e.g. of a solvent. These compounds generally comprise a combination of polar (hydrophilic) and nonpolar (hydrophobic) fractions. They arrange themselves at the phase boundary between two media of differing polarity [i.e. at the interface which separates two immiscible phases (gas-liquid, gas-solid, liquid-solid, liquid-liquid, solid-solid)], for example between a water phase and an organic phase, or, when space is no longer available for this, they lie together and form micelles. However, surface-active agents is also the term used to refer to those substances which change, for example hydrophilicize or hydrophobicize, the surface of a material treated therewith.

Within the context of the present invention, surface modification is to be understood as meaning the change in the interface properties of the media admixed with the polymers according to the invention. Here, interfaces (phase interfaces) are understood as meaning surfaces which separate two immiscible phases from one another (gas-liquid, gas-solid, liquid-solid, liquid-liquid, solid-solid). These include the adhesion, sticking or sealing action, the flexibility, scratch or breakage resistance, the wettability and wetting capability, sliding properties, frictional force, corrodability, dyeability, printability and gas permeability of the application media. Accordingly, the polymers according to the invention are preferably used as hydrophilicizing agents, lipophilizing agents (hydrophobicizing agents), corrosion inhibitors, friction reducers, emulsifiers, dispersants, adhesion promoters, wetting agents, wetting inhibitors, volatilizing agents or printing ink additives.

The polymers according to the invention are suitable, for example, for changing the affinity of a substrate surface toward water and water-containing liquids compared to an unmodified surface. The polymers used according to the invention for this purpose comprise on the one hand molecular moieties which improve the affinity of a surface treated therewith toward water (hydrophilicize) and on the other hand those which reduce the affinity of a surface treated therewith toward water (hydrophobilized). A suitable measure for assessing the hydrophilicity/hydrophobicity of the surface of a substrate is the measurement of the contact angle of water on the particular surface (see, e.g. Römpp, Chemielexikon, 9th edition, p. 372 "Wetting", Georg-Thieme-Verlag (1995)). According to the invention, a "hydrophobic surface" is understood as meaning a surface whose contact angle of water is >90. "Hydrophilic surface" is understood as meaning a surface whose contact angle of water is ≤90°. Hydrophilicizing polymers bring about a decrease in the contact angle on surfaces treated therewith compared to the unmodified surface. Hydrophobicizing polymers bring about an increase in the contact angle on surfaces treated with them compared to the unmodified surface.

Organic materials suitable for the surface modification with the polymers according to the invention are, for example, plastics, in particular polyolefins, such as polyethylene, polypropylene, polyisobutene and polyisoprene, and polyaromatics, such as polystyrene, and also copolymers and mixtures thereof, the plastics preferably being in the form of films or moldings; cellulose, for example in the form of paper or cardboard; textiles made of natural or synthetic fibers; leather; wood; mineral oil products, such as fuels or lubricants; and additives for such mineral oil products, such as lubricity improvers and cold flow improvers. Suitable inorganic materials are, for example, inorganic pigments, metal, glass and basic inorganic materials, such as cement, gypsum or calcium carbonate.

Preferably, however, the polymers according to the invention are used as surfactant, detergent, wetting agent, wetting inhibitor, emulsifier, demulsifier, dispersant, protective colloid, adhesion promoter, foam former, rheology modifier, thickener, melt viscosity lowerer for polymers, corrosion inhibitor, friction reducer, liquefier for adhesives or resins, dispersion liquefier, binder for adhesives and resins, binder for textiles, crosslinker, solubilizer, encapsulation agent, retanning agent, hydrophobicizing agent or hydrophilicizing agent.

The invention is now illustrated in more detail by reference to the following nonlimiting examples.

EXAMPLES

The amine number was determined in accordance with DIN 53176. The viscosity was determined using a rheometer (Physica MCR51 from Anton Paar GmbH, Graz, Austria). To determine the solubility, the product and the solvent were mixed in a weight ratio of 10:90 and heated using a heating gun. The product is deemed soluble if it does not precipitate upon cooling.

The molecular weights ($M_n$, $M_w$) refer to values which arise with gel permeation chromatography (GPC) in a suitable solvent, such as hexafluoroisopropanol, tetrahydrofuran, N,N-dimethylacetamide or water, with PMMA calibration. It should be noted that this measurement method in the case of the present polymers only leads to relative values; i.e. only structurally related systems with similar polarity can be compared with one another.

1. Preparation of Highly Branched Melamine-polyamine Polymers 1.1 Preparation of Highly Branched Melamine-tetraethylenepentamine Polymers 2.8 mol of tetraethylenepentamine were initially introduced and admixed with 0.65 mol of ammonium chloride as catalyst, and a gentle stream of nitrogen was applied. 1 mol of melamine was added in 4 portions of 0.25 mol. After each addition of melamine, the reaction mixture was heated to 200° C. and stirred until the melamine had dissolved. Following dissolution, the mixture was cooled firstly to 100° C. before the next portion was added. After adding the last portion, the reaction mixture was stirred at 200° C. until the viscosity did not increase further (ca. 20 000 mPas at 75° C.). After cooling, the catalyst was neutralized with 50% strength sodium hydroxide solution and sodium hydroxide formed in the process was filtered off at 90° C. via a suction filter. This gave a yellow polymer with the following properties:

Viscosity (75° C.) η=1500 mPas
Solubility: HFIP (=hexafluoroisopropanol), water
Amine number: 757 mg KOH/g 1.2 Preparation of Highly Branched Melamine-pentaethylenehexamine Polymers 2.8 mol of pentaethylenehexamine were initially introduced and admixed with 0.65 mol of ammonium chloride as catalyst, and a gentle stream of nitrogen was applied. 1 mol of melamine was added in 4 portions of 0.25 mol. After each addition of melamine, the reaction mixture was heated to 200° C. and stirred until the melamine had dissolved. Following dissolution, the mixture was first cooled to 100° C. before the next portion was added. Following the addition of the last portion, the reaction mixture was stirred at 200°

C. until the viscosity did not increase further (ca. 20 000 mPas at 75° C.). After cooling, the catalyst was neutralized with 50% strength sodium hydroxide solution and sodium hydroxide formed in the process was filtered off at 90° C. via a suction filter. This gave a polymer with the following properties:
Viscosity (75° C.) η=3250 mPas
$M_n$=6300
$M_w$=24 400
Solubility: HFIP (=hexafluoroisopropanol), water
Amine number: 665 mg KOH/g 2. Functionalization of Highly Branched Melamine-polyamine Polymers 2.1 Functionalization of the Polymer from Example 1.1 Through Reaction with Oleic Acid The polymer obtained in example 1.1 was initially introduced into a flask and admixed with 0.2 mol of oleic acid. The mixture was heated to 120° C. and the water of reaction that formed was removed by distillation. The temperature was increased here stepwise to 180° C. After further water was no longer formed, the mixture was stirred for a further hour at 180° C. This gave a dark yellow, honey-like-flowing polymer with the following properties:
Viscosity (75° C.) η=1500 mPas
Solubility: HFIP (=hexafluoroisopropanol), water
The product forms a stable foam in water even at low concentrations of 0.5%.
CMC (critical micelle concentration) value (25° C.): 0.12 g/l 2.2 Functionalization of the Polymer from Example 1.2 Through Reaction with Oleic Acid The polymer obtained in example 1.2 was initially introduced into a flask and admixed with 0.2 mol of oleic acid. The mixture was heated to 120° C. and the water of reaction that formed was removed by distillation. The temperature was increased stepwise to 180° C. After further water was no longer formed, the mixture was stirred for a further hour at 180° C. This gave a dark yellow, honey-like-flowing polymer with the following properties:
Viscosity (75° C.) η=1000 mPas
Solubility: HFIP (=hexafluoroisopropanol), water
The product forms a stable foam in water even at low concentrations of 0.05%.
CMC (critical micelle concentration) value (25° C.): 0.11 g/l 2.3 Functionalization of the Polymer from Example 1.2 Through Reaction with Lauric Acid The polymer obtained in example 1.2 was initially introduced into a flask and admixed with 0.2 mol of lauric acid. The mixture was heated to 120° C. and the water of reaction that formed was removed by distillation. The temperature was increased stepwise to 180° C. After further water was no longer formed, the mixture was stirred for a further hour at 180° C. This gave a dark yellow, honey-like-flowing polymer with the following properties:
Viscosity (75° C.) η=2500 mPas
Solubility: HFIP (=hexafluoroisopropanol), water
The product forms a stable foam in water even at low concentrations of 0.05%.
CMC (critical micelle concentration) value (25° C.): 0.7 g/l 2.4 Functionalization of the Polymer from Example 1.2 Through Reaction with Polyisobutenyl-substituted Succinic Anhydride (PIBSA; $M_n$ of the Polyisobutenyl Radical: 550)

The polymer obtained in example 1.2 was initially introduced into a flask and admixed with 0.2 mol of polyisobutenyl-substituted succinic anhydride (PIBSA; $M_n$ of the polyisobutenyl radical: 550). The mixture was heated to 120° C. and the water of reaction that formed was removed by distillation. The temperature was increased stepwise to 180° C. After further water was no longer formed, the mixture was stirred for a further hour at 180° C. This gave a brownish, viscous polymer with the following properties:
Viscosity (75° C.) η=10 800 mPas
Solubility: HFIP (=hexafluoroisopropanol), water
The product forms a stable foam in water even at low concentrations of 0.05%.
$M_n$=3700
$M_w$=9350
PD=2.5

2.5 Functionalization of the Polymer from Example 1.1 Through Reaction with Ethylene Oxide and then with Propylene Oxide 100 g of a polymer of melamine and tetraethylenepentamine (90.9% in water) obtained analogously to example 1.1 were initially introduced into an autoclave at 80° C. and the reaction vessel was rendered inert with nitrogen. At 110° C., 42.1 g (0.96 mol) of ethylene oxide were metered in over the course of 10 min and the mixture was then after stirred for 5 h. After adding 4.07 g of KOH (50% strength in water), the mixture was dewatered for 2 h at 120° C. and <10 mbar vacuum. The temperature was then increased to 140° C. and 800 g of ethylene oxide (18.2 mol) were metered in over the course of 16 h. When the metered addition was complete, the mixture was after stirred for a further 10 h at 140° C. Volatile constituents were removed in vacuo. 947 g of a melamine-tetraethylenepentamine condensate with 20.3 ethylene oxide units per NH function were obtained as a dark, liquid substance.
$M_n$=3300
$M_w$=125 000
Amine number: 84 mg KOH/g 300 g of the polymer functionalized with ethylene oxide were initially introduced into an autoclave. After rendering inert with nitrogen, the temperature was increased to 140° C. and 282 g (4.85 mol) of propylene oxide were added, metered by weight, over the course of 6 h. The mixture was then after stirred for 7 h at 140° C. After cooling, volatile constituents were removed in vacuo. This gave 600 g of a melamine-tetraethylenepentamine condensate with 20.3 ethylene oxide units and 17.0 propylene oxide units per NH function.
$M_n$=1200
$M_w$=260 000
Amine number: 41 mg KOH/g 2.6 Functionalization of the Polymer from Example 1.1 Through Reaction with Propylene Oxide 120 g of a polymer of melamine and tetraethylenepentamine (98% in water) obtained analogously to example 1.1 were initially introduced into an autoclave at 80° C. and the reaction vessel was rendered inert with nitrogen. At 100° C., 86.0 g (1.47 mol) of propylene oxide were metered in over the course of 10 min and then the mixture was after stirred for 18 h. 3.8 g of potassium tert-butylate were added to 133 g of the resulting product and the temperature was increased to 130° C. 675 g of propylene oxide (11.6 mol) were metered in over the course of 6.5 h. When the metered addition was complete, the mixture was after stirred for a further 10 h at 130° C. Volatile constituents were removed in vacuo. This gave 818 g of a melamine-tetraethylenepentamine condensate with 10.0 propylene oxide units per NH function as dark, liquid substance.
$M_n$=2020
$M_w$=2940
Amine number: 89.6 mg KOH/g

The invention claimed is:

1. A process for preparing an amphiphilic functionalized highly branched melamine-polyamine polymer, the process comprising:
   (A-i) condensing at a reaction temperature ranging from 100 to 300° C. and at a pressure from 1 to 20 bar until the resulting reaction mixture reaches a viscosity of from 250 to 100,000 mPas as measured at 75° C., the reaction then being terminated by lowering the temperature to be from 20 to less than 100° C.,
      (A-i.1) melamine and optionally a melamine derivative, wherein the melamine derivative is selected from the group consisting of benzoguanamine, a substituted melamine, and a melamine condensate, with
      (A-i.2) an amine comprising at least two primary amino groups, which is different from (A-i.1),
   and optionally with at least one selected from the group consisting of
      (A-i.3) at least one selected from the group consisting of urea and a urea derivative,
      (A-i.4) an at least Bifunctional di- or polyisocyanate, and
      (A-i.5) a carboxylic acid comprising at least two carboxyl groups or a derivative thereof wherein said derivative is selected from the group consisting of a carboxylic acid halide, a carboxylic acid anhydride, and a carboxylic acid ester,
   to obtain a polymer segment;
   (A-ii) optionally quaternizing a portion of the amino groups of the polymer segment obtained in (A-i) by reacting the polymer obtained in (A-i) with a quaternizing agent at a temperature of from −40° C. to 100° C. until at least 5% to at most 80% of the primary and secondary amino groups present in the polymer are quaternized;
   (A-iii) reacting the polymer segment obtained in (A-i) or (A-ii) with a compound which can enter into a condensation reaction or addition reaction with amino groups and which leads to the formation of a hydrophobic polymer segment at a reaction temperature of from 80 to 250° C. under an inert gas stream, wherein the compound is at least one selected from the group consisting of:
      (A-iii.1) an aliphatic $C_4$-$C_{22}$-monocarboxylic acid or a derivative thereof;
      (A-iii.2) an α,β-dicarboxylic acid comprising at least 6 carbon atoms or a derivative thereof;
      (A-iii.3) an aliphatic, cycloaliphatic, or aromatic optionally capped isocyanate comprising at least 6 carbon atoms;
      (A-iii.4) an aliphatic monoamine comprising at least 6 carbon atoms;
      (A-iii.5) an aliphatic polyamine having all amino groups arranged linearly relative to one another, wherein a ratio of a number of carbon atoms to a number of nitrogen atoms present in the polyamine is at least 2.5:1;
      (A-iii.6) an alkylene oxide comprising at least 3 carbon atoms selected from the group consisting of propylene oxide, butylene oxide, pentylene oxide, and styrene oxide;
      (A-iii.7) a polyetheramine of formula V:

$$NH_2\text{-}[A^4\text{-}O]_P\text{-}A^4\text{-}NH_2 \quad (V),$$

wherein:
      each $A^4$ is independently a linear or branched $C_3$-$C_4$-alkylene; and
      p is a number from 1 to 5,000;
      (A-iii.8) a ketone or an aldehyde comprising at least 6 carbon atoms; and
      (A-iii.9) an aldehyde in combination with a CH-acidic compound comprising at least 4 carbon atoms or with a hydroxyaromatic comprising an aliphatic radical comprising at least 4 carbon atoms as substituent;
   wherein when the compound of (A-iii) is (A-iii.6) an alkylene oxide comprising at least 3 carbon atoms, a reaction with ethylene oxide precedes the reaction with (A-iii.6) the alkylene oxide comprising at least 3 carbon atoms and wherein during the reaction the formed water of reaction if a carboxylic acid has been used, the formed hydrogen halide if an acid halide derivative of a carboxylic acid has been used, the formed alcohol if an ester has been used, or the formed acid if an anhydride derivative of a carboxylic acid has been used is removed; and
   (A-iv) optionally quaternizing a portion of the amino groups in the polymer segment obtained in (A-i) by reacting the polymer obtained in (A-i) with a quaternizing agent at a temperature of from −40° C. to 100° C. until at least 5% to at most 80% of the primary and secondary amino groups present in the polymer are quaternized;
   wherein a hydrophilic polymer segment is obtained in (A-i), (A-ii), or (A-iv), and
   wherein the area derivative of (A-i.3) is selected from the group consisting of:
      a substituted urea of the formula $R^1R^2N$—C(=O)—$NR^3R^4$, wherein $R^1$, $R^2$, $R^3$, and $R^4$ are each independently hydrogen, a $C_1$-$C_{12}$-alkyl, an aryl, or an aryl-$C_1$-$C_4$-alkyl, wherein at least one of the radicals $R^1$, $R^2$, $R^3$, and $R^4$ is not hydrogen: or at least one selected from the group consisting of i) $R^1$ and $R^2$ and ii) $R^3$ and $R^4$ are in each case together a $C_2$-$C_5$-alkylene, wherein a methylene group may optionally be replaced by a carbonyl group; or $R^1$ and $R^3$ are together a $C_2$-$C_5$-alkylene, wherein a methylene group may optionally be replaced by a carbonyl group; or at least one selected from the group consisting of i) $R^1$ and $R^2$ and ii) $R^3$ and $R^4$, in each case together with the nitrogen atom to which they are bonded, form a 5- or 6-membered unsaturated aromatic or nonaromatic ring optionally comprising one or two further nitrogen atoms, a sulfur atom, or an oxygen atom as a ring member;
      biuret;
      thiourea;
      a substituted thiourea of formula $R^5R^6N$—C(=S)—$NR^7R^8$, wherein $R^5$, $R^6$, $R^7$, and $R^8$ are each independently hydrogen, a $C_1$-$C_{12}$-alkyl, an aryl, or an aryl-$C_1$-$C_4$-alkyl, wherein at least one of the radicals $R^5$, $R^6$, $R^7$, and $R^8$ is not hydrogen; or at least one selected from the group consisting of i) $R^5$ and $R^6$ and ii) $R^7$ and $R^8$, in each case together, are a $C_2$-$C_5$-alkylene, wherein a methylene group may optionally be replaced by a carbonyl group; or $R^5$ and $R^7$ are together $C_2$-$C_5$-alkylene, wherein a methylene group may be optionally replaced by a carbonyl group; or at least one selected from the group consisting of i) $R^5$ and $R^6$ and ii) $R^7$ and $R^8$, in each case together with the nitrogen atom to which they are bonded, form a 5- or 6-membered unsaturated aromatic or nonaromatic ring optionally comprising one or two further nitrogen atoms, a sulfur atom, or an oxygen atom as a ring member;

guanidine;

a substituted guanidine of formula $R^9R^{10}N$—$C(=NR^{11})$—$NR^{12}R^{13}$ wherein $R^9$, $R^{10}$, $R^{11}$, $R^{12}$, and $R^{13}$ are each independently hydrogen, a $C_1$-$C_{12}$-alkyl an aryl, or an aryl-$C_1$-$C_4$-alkyl, wherein at least one of the radicals $R^9$, $R^{10}$, $R^{11}$, $R^{12}$, and $R^{13}$ is not hydrogen; or at least one selected from the group consisting of i) $R^9$ and $R^{10}$ and ii) $R^{12}$ and $R^{13}$, in each case together, are a $C_2$-$C_5$-alkylene, wherein a methylene group may optionally be replaced by a carbonyl group; or $R^9$ and $R^{12}$ together are a $C_2$-$C_5$-alkylene, wherein a methylene group may optionally be replaced by a carbonyl group; or at least one selected from the group consisting of i) $R^9$ and $R^{10}$ and ii) $R^{12}$ and $R^{13}$, in each case together with the nitrogen atom to which they are bonded, form a 5- or 6-membered unsaturated aromatic or nonaromatic ring optionally comprising one or two further nitrogen atoms, a sulfur atom, or an oxygen atom as a ring member; and a carbonic acid ester of formula $R^{14}$—O—CO—O—$R^{15}$, wherein $R^{14}$ and $R^{15}$ are each independently a $C_1$-$C_{12}$-alkyl, an aryl, or an aryl-$C_1$-$C_4$-alkyl or $R^{14}$ and $R^{15}$ together are a $C_2$-$C_5$-alkylene.

2. The process of claim 1, wherein the amine (A-i.2) is at least one selected from the group consisting of:

1,2-ethylenediamine;
1,2-propylenediamine;
1,3-propylenediamine;
a polyamine comprising two primary amino groups and at least one selected from the group consisting of i) a secondary or tertiary amino group and ii) an ether oxygen atom, having all amino groups and ether oxygen atoms arranged linearly relative to one another, wherein a ratio of a number of carbon atoms to a number of nitrogen atoms present in the polyamine and optionally present oxygen atoms is less than 2.5:1; and
a polyamine comprising at least two primary amino groups, a further primary or a secondary amino group, and optionally at least one selected from the group consisting of i) a further primary, secondary, or tertiary amino group and ii) optionally an ether oxygen atom, having at least three amino groups which are not arranged linearly relative to one another, wherein a ratio of a number of carbon atoms to a number of nitrogen atoms present in the polyamine and optionally present oxygen atoms is less than or equal to 3:1.

3. The process of claim 2, where the amine (A-i.2) comprises two primary amino groups.

4. The process of claim 3, where the amine (A-i.2) comprises an amine of formula I.1:

$$NH_2\text{--}[\text{--}A^1\text{-}X^1\text{--}]_m\text{-}A^1\text{-}NH_2 \quad (I.),$$

wherein:
each $A^1$ is independently 1,2-ethylene, 1,3-propylene, or 1,2-propylene, with the proviso that when m is not 0, a number of 1,2-ethylene units $A^1$ to a total number of 1,3-propylene units and 1,2-propylene units $A^1$ present in the compound of formula I.1 is at least 1:1;
each $X^1$ is independently O or $NR^a$;
$R^a$ is H, a $C_1$-$C_4$-alkyl, a $C_2$-$C_4$-hydroxyalkyl, or a $C_1$-$C_4$-alkoxy; and
m is a number from 0 to 100.

5. The process of claim 2, wherein the amine (A-i.2) comprises an amine of formula II.1:

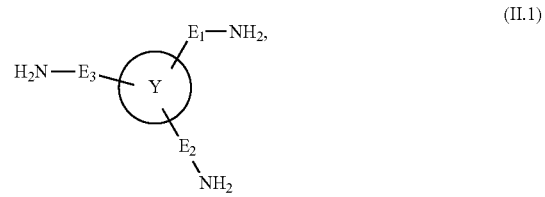

wherein:
Y is $CR^b$, N, or a 5- or 6-membered, saturated, partially unsaturated, or aromatic heterocyclic ring comprising 1, 2, or 3 heteroatoms as ring members selected from the group consisting of N, O, and S;
$E_1$, $E_2$, and $E_3$ are each independently a single bond, a group -$[\text{-}A^2\text{-}X^2\text{-}]_n$-$A^2$-, a group —$NR^c$-$A^2$-, or a group —O-$A^2$-, with the proviso that $E_1$, $E_2$, and $E_3$ are not a single bond and not —$NR^c$-$A^2$- when Y is N;
each $A^2$ is independently 1,2-ethylene, 1,3-propylene, or 1,2-propylene;
each $X^2$ is independently O or $NR^d$;
$R^b$ is H, a $C_1$-$C_4$-alkyl, a $C_2$-$C_4$-hydroxyalkyl, or a $C_1$-$C_4$-alkoxy;
$R^c$ and $R^d$ are independently H, a $C_1$-$C_4$-alkyl, a $C_2$-$C_4$-hydroxyalkyl, or a $C_1$-$C_4$-alkoxy; and
n is a number from 0 to 10.

6. The process of claim 5, wherein, in formula II.1:
Y is N; and
$E_1$, $E_2$, and $E_3$ are each independently a group -$[\text{-}A^2\text{-}X^2\text{-}]_n$-$A^2$-, wherein n is 0.

7. The process of claim 5, wherein the amine (A-i.2) is at least one selected from the group consisting of 1,2-ethylenediamine; 1,2-propylenediamine; 1,3-propylenediamine; diethylenetriamine; triethylenetetramine; tetraethylenepentamine; pentaethylenehexamine; hexaethyleneheptamine; heptaethyleneoctamine; octaethylenenonamine; bis(3-aminopropyl)amine; bis(3-aminopropyl)methylamine; N,N-bis(3-aminopropyl)ethylenediamine; N,N-bis(3-aminopropyl)propane-1,3-diamine; N,N-bis(3-aminopropyl)butane-1,4-diamine; tris(2-aminoethyl)amine; tris(2-aminopropyl)amine; tris(3-aminopropyl)amine; trisaminohexane; a compound of formula I.1 : $NH_2\text{--}[\text{--}A^1\text{-}X^1\text{--}]_m\text{-}A^1\text{-}NH_2$, wherein $X^1$ is $NR^a$, at least one $A^1$ is 1,3-propylene or 1,2-propylene, and m is a number from 1 to 100; and a compound of formula I.1, wherein $X^1$ is O and m is a number from 2 to 100.

8. The process of claim 2, wherein the amine (A-i.2) comprises a polyamine of formula IV:

$$NH_2\text{-}[A^3\text{-}X^3]_o\text{-}A^3\text{-}NH_2 \quad (IV),$$

wherein:
each $A^3$ is independently a linear or branched $C_3$-$C_{10}$-alkylene;
$X^3$ is O or $NR^e$;
$R^e$ is H, a $C_1$-$C_4$-alkyl, a $C_2$-$C_4$-hydroxyalkyl, or a $C_1$-$C_4$-alkoxy; and
O is a number from 0 to 100,
with the proviso that $A^3$ is a $C_4$-$C_{10}$-alkylene when o is 0,
wherein after (A-i), a portion of the amino groups are quaternized in (A-ii), or if the process does not comprise (A-ii) and the compound of (A-iii) comprises no quaternizable groups, a portion of the amino groups are quaternized in (A-iv).

9. The process of claim 1, wherein the compound (A-iii) is at least one selected from the group consisting of:
(A-iii.1) an aliphatic $C_{10}$-$C_{22}$-monocarboxylic acid or a derivative thereof;
(A-iii.2) an α,β-dicarboxylic acid comprising at least 10 carbon atoms; and
(A-iii.6) an alkylene oxide comprising at least 3 carbon atoms.

10. The process of claim 1, where, in (A-i), a molar ratio of the amine (A-i.2) and component (A-i.1) is such that a ratio of a number of primary amino groups present in the amine (A-i.2) to a number of primary amino groups present in component (A-i.1) is at least 1:1.

11. The process of claim 1, where the melamine derivative is present in component (A-i.1).

12. The process of claim 1, wherein the condensing (A-i) includes condensing a urea derivative of (A-i.3).

13. The process of claim 1, wherein
$R^2$ and $R^4$ are hydrogen and $R^1$ and $R^3$ are identical and are a $C_1$-$C_{12}$-alkyl, an aryl or an aryl-$C_1$-$C_4$-alkyl; or $R^1$, $R^2$, $R^3$, and $R^4$ are identical and are a linear $C_1$-$C_4$-alkyl; or $R^1$ and $R^2$, and $R^3$ and $R^4$, in each case together, are a $C_2$-$C_5$-alkylene, wherein a methylene group may be optionally replaced by a carbonyl group; or $R^2$ and $R^4$ are hydrogen and $R^1$ and $R^3$ together are a $C_2$-$C_5$-alkylene, wherein a methylene group may be optionally replaced by a carbonyl group; or $R^1$ and $R^2$, and $R^3$ and $R^4$, in each case together with the nitrogen atom to which they are bonded, form a 5- or 6-membered unsaturated aromatic or nonaromatic ring optionally comprising a further nitrogen atom, sulfur atom, or oxygen atom as a ring member;
$R^6$ and $R^8$ are hydrogen and $R^5$ and $R^7$ are identical and are a $C_1$-$C_{12}$-alkyl, an aryl, or an aryl-$C_1$-$C_4$-alkyl; or $R^5$, $R^6$, $R^7$, and $R^8$ are identical and are a linear $C_1$-$C_4$-alkyl; or $R^5$ and $R^6$, and $R^7$ and $R^8$, in each case together, are a $C_2$-$C_5$-alkylene, wherein a methylene group may optionally be replaced by a carbonyl group; or $R^6$ and $R^8$ are hydrogen and $R^5$ and $R^7$ together are a $C_2$-$C_5$-alkylene, wherein a methylene group may be optionally replaced by a carbonyl group; or $R^5$ and $R^6$, and $R^7$ and $R^8$, in each case together with the nitrogen atom to which they are bonded, form a 5- or 6-membered unsaturated aromatic or nonaromatic ring optionally comprising a further nitrogen atom, sulfur atom, or oxygen atom as a ring member;
$R^{10}$, $R^{11}$ and $R^{13}$ are hydrogen and $R^9$ and $R^{12}$ are identical and are a $C_1$-$C_{12}$-alkyl, an aryl, or an aryl-$C_1$-$C_4$-alkyl; or $R^9$, $R^{10}$, $R^{12}$, $R^{14}$ are identical and are a linear $C_1$-$C_4$-alkyl and $R^{11}$ is H or methyl; or $R^9$ and $R^{10}$, and $R^{12}$ and $R^{13}$, in each case together, are a $C_2$-$C_5$-alkylene, wherein a methylene group may optionally be replaced by a carbonyl group, and $R^{11}$, is H or methyl; or $R^{10}$, $R^{11}$ and $R^{13}$ are hydrogen and $R^9$ and $R^{12}$ together are a $C_2$-$C_5$-alkylene, wherein a methylene group may be optionally be replaced by a carbonyl group; or $R^9$ and $R^{10}$, and $R^{12}$ and $R^{13}$, in each case together with the nitrogen atom to which they are bonded, form a 5- or 6-membered unsaturated aromatic or nonaromatic ring optionally comprising a further nitrogen atom, sulfur atom, or oxygen atom as a ring member, and $R^{11}$ is H or methyl;
$R^{14}$ and $R^{15}$ are identical and a $C_1$-$C_4$-alkyl.

14. The process of claim 1, where the condensation (A-i) is carried out in the presence of an acidic catalyst.

15. The process of claim 1, where the condensation (A-i) is carried out at a temperature of from 150 to 230° C.

16. The process of claim 1, where the condensation (A-i) is carried out until the viscosity of a reaction product is 500 to 100,000 mPas (at 75° C.).

17. The process of claim 1, comprising performing the quaternizing (A-ii) or (A-iv) by reaction with at least one selected from the group consisting of a Brönsted acid and an alkylating agent.

18. A functionalized highly branched melamine-polyamine polymer obtainable by the process of claim 1.

19. The polymer of claim 18, being essentially non-crosslinked.

20. The polymer of claim 18, having a number-average molecular weight $M_n$ in a range from 500 to 200,000.

21. The process of claim 1, wherein:
the condensing (A-i) comprises condensing melamine with at least one selected from the group consisting of 1,2-ethylene diamine; 1,2-propylene diamine: 1,3-propylenediamine; diethylenetriamine; triethylene tetramine; tetraethylenepentamine; pentaethylenehexamine; hexaethyleneheptamine; heptaethyleneoctamine; octaethylenenonamine; bis(3-aminopropyl)amine; bis(3-amino propyl)methylamine; N,N-bis(3-aminopropyl)ethylenediamine; N,N-bis(3-amino propyl) propane-1,3-diamine; N,N-bis(3-aminopropyl)butane-1,4-diamine; tris(2-amino ethyl)amine; tris(2-aminopropyl)amine; tris(3-aminopropyl)amine and trisaminohexane; and
the polymer segment (A-i) is a hydrophilic polymer segment.

22. The process of claim 1, wherein:
the condensing (A-i) comprises condensing melamine with tetraethylenepentamine; and
the polymer segment (A-i) is a hydrophilic polymer segment.

23. The process of claim 1, wherein the melamine condensate is selected from the group consisting of melam, melem, melon and a higher condensate.

24. The process of claim 1, wherein in (A-iii.6) the molar ratio of the total number of primary, secondary and tertiary amino groups present in the amine of component (A-i.2) to the alkylene oxide is 1:3 to 1:100.

25. A process for preparing an amphiphilic functionalized highly branched melamine-polyamine polymer, the process comprising:
(B-i) condensing at a reaction temperature ranging from 100 to 300° C. and at a pressure from 1 to 20 bar until the resulting reaction mixture reaches a viscosity of from 250 to 100,000 mPas as measured at 75° C., the reaction then being terminated by lowering the temperature to be from 20 to less than 100° C.
(B-i.1) melamine and optionally a melamine derivative, wherein the melamine derivative is selected from the group consisting of benzoguanamine, a substituted melamine, and a melamine condensate, with
(B-i.2) an amine comprising at least two primary amino groups, which is different from (B-i.1),
and optionally with at least one selected from the group consisting of
(B-i.3) at least one selected from the group consisting of urea and a urea derivative,
(B-i.4) an at least difunctional di- or polyisocyanate, and
(B-i.5) a carboxylic acid comprising at least two carboxyl groups or a derivative thereof wherein said derivative is selected from the group consisting of a carboxylic acid halide, a carboxylic acid anhydride, and a carboxylic acid ester, to obtain a hydrophobic polymer segment; and
(B-iii) reacting the hydrophobic polymer segment obtained in (B-i) with a compound which can enter into a condensation reaction or addition reaction with amino groups and which leads to the formation of a hydrophilic polymer segment at a reaction temperature of from 80 to 250° C. under an inert gas stream, wherein the compound is at least one selected from the group consisting of:
(B-iii.1) a polyamine comprising two primary amino groups and at least one selected from the group consisting of a further amino group and an ether oxygen atom, wherein a ratio of a number of carbon atoms to a number of nitrogen atoms present in the polyamine and optionally present oxygen atoms is less than 2.5:1; and
(B-iii.2) ethylene oxide;
wherein when the compound of (B-iii) is ethylene oxide, a reaction with an alkylene oxide comprising at least three carbon atoms selected from the group consisting of propylene oxide, butylene oxide, pentylene oxide, and styrene oxide precede the reaction with ethylene oxide) and wherein during the reaction the formed water of reaction if a carboxylic acid has been used, the formed hydrogen halide if an acid halide has been used, the formed alcohol if an ester has been used, or the formed acid if an anhydride has been used is removed, and
wherein the urea derivative of (B-i.3) is selected from the group consisting of:
a substituted urea of the formula $R^1R^2N$—$C(=O)$—$NR^3R^4$, wherein $R^1$, $R^2$, $R^3$, and $R^4$ are each independently hydrogen, a $C_1$-$C_{12}$-alkyl, an aryl, or an aryl-$C_1$-$C_4$-alkyl, wherein at least one of the radicals $R^1$, $R^2$, $R^3$, and $R^4$ is not hydrogen; or at least one selected from the group consisting of i) $R^1$ and $R^2$ and ii) $R^3$ and $R^4$ are in each case together a $C_2$-$C_5$-alkylene, wherein a methylene group may optionally be replaced by a carbonyl group; or $R^1$ and $R^3$ are together a $C_2$-$C_5$-alkylene, wherein a methylene group may optionally be replaced by a carbonyl group; or at least one selected from the group consisting of i) $R^1$ and $R^2$ and ii) $R^3$ and $R^4$, in each case together with the nitrogen atom to which they are bonded, form a 5- or 6-membered unsaturated aromatic or nonaromatic ring optionally comprising one or two further nitrogen atoms, a sulfur atom, or an oxygen atom as a ring member;
biuret;
thiourea;
a substituted thiourea of formula $R^5R^6N$—$C(=S)$—$NR^7R^8$, wherein $R^5$, $R^6$, $R^7$, and $R^8$ are each independently hydrogen, a $C_1$-$C_{12}$-alkyl, an aryl, or an aryl-$C_1$-$C_4$-alkyl, wherein at least one of the radicals $R^5$, $R^6$, $R^7$, and $R^8$ is not hydrogen; or at least one selected from the group consisting of i) $R^5$ and $R^6$ and ii) $R^7$ and $R^8$, in each case together, are a $C_2$-$C_5$-alkylene, wherein a methylene group may optionally be replaced by a carbonyl group; or $R^5$ and $R^7$ are together $C_2$-$C_5$-alkylene, wherein a methylene group may be optionally replaced by a carbonyl group; or at least one selected from the group consisting of i) $R^5$ and $R^6$ and ii) $R^7$ and $R^8$, in each case together with the nitrogen atom to which they are bonded, form a 5- or 6-membered unsaturated aromatic or nonaromatic ring optionally comprising one or two further nitrogen atoms, a sulfur atom, or an oxygen atom as a ring member;
guanidine;
a substituted guanidine of formula $R^9R^{10}N$—$C(=NR^{11})$—$NR^{12}R^{13}$, wherein $R^9$, $R^{10}$, $R^{11}$, $R^{12}$, and $R^{13}$ are each independently hydrogen, a $C_1$-$C_{12}$-alkyl, an aryl, or an aryl-$C_1$-$C_4$-alkyl, wherein at least one of the radicals $R^9$, $R^{10}$, $R^{11}$, $R^{12}$, and $R^{13}$ is not hydrogen; or at least one selected from the group consisting of i) $R^9$ and $R^{10}$ and ii) $R^{12}$ and $R^{13}$, in each case together, are a $C_2$-$C_5$-alkylene, wherein a methylene group may optionally be replaced by a carbonyl group; or $R^9$ and $R^{12}$ together are a $C_2$-$C_5$-alkylene, wherein a methylene group may optionally be replaced by a carbonyl group; or at least one selected from the group consisting of i) $R^9$ and $R^{10}$ and ii) $R^{12}$ and $R^{13}$, in each case together with the nitrogen atom to which they are bonded, form a 5- or 6-membered unsaturated aromatic or nonaromatic ring optionally comprising one or two further nitrogen atoms, a sulfur atom, or an oxygen atom as a ring member; and
a carbonic acid ester of formula $R^{14}$—O—CO—O—$R^{15}$, wherein $R^{14}$ and $R^{15}$ are each independently a $C_1$-$C_{12}$-alkyl, an aryl, or an aryl-$C_1$-$C_4$-alkyl or $R^{14}$ and $R^{15}$ together are a $C_2$-$C_5$-alkylene.

26. The process of claim 25, where the amine (B-i.2) is at least one selected from the group consisting of:
a diamine of formula VI:

$$NH_2\text{-}A^5\text{-}NH_2 \qquad (VI),$$

wherein $A^5$ is a divalent aliphatic, alicyclic, aliphatic-alicyclic, aromatic, or araliphatic radical, wherein the aliphatic and the alicyclic radical comprise at least 4 carbon atoms; and
a polyamine comprising two primary amino groups and at least one selected from the group consisting of i) a further secondary or tertiary amino group and ii) an ether oxygen atom, having all amino groups and ether oxygen atoms arranged linearly relative to one another, wherein a ratio of a number of carbon atoms to the number of nitrogen atoms present in the polyamine present and optionally present oxygen atoms is at least 2.5:1.

27. The process of claim 26, where the amine (B-i.2) is at least one selected from the group consisting of:
an amine of formula (VI.1):

$$NH_2\text{-}A^{5a}\text{-}NH_2 \qquad (VI.1),$$

wherein $A^{5a}$ is a linear or branched alkylene group comprising at least 5 carbon atoms; and
a polyetheramine of formula VII:

$$NH_2\text{-}[A^6\text{-}O]_q\text{-}A^6\text{-}NH_2 \qquad (VII)$$

wherein each $A^6$ is independently a linear or branched $C_3$-$C_4$-alkylene and q is a number from 1 to 5,000.

28. The process of claim 27, further comprising after (B-iii):
quaternizing a portion of the amino groups present in the polymer if the compound employed in (B-iii) is a diamine, and
reacting a product obtained in (B-iii) with ethylene oxide if ethylene oxide is not employed in (B-iii).

29. The process of claim 25, wherein the compound of (B-iii) is ethylene oxide and a polymer obtained in (B-iii) is terminated with a sulfate group or phosphate group.

30. A process for preparing an amphiphilic functionalized highly branched melamine-polyamine polymer, the process comprising:
- (B-i) condensing
  - (B-i.1) melamine and optionally a melamine derivative, wherein the melamine derivative is selected from the group consisting of benzoguanamine, a substituted melamine, and a melamine condensate, with
  - (B-i.2) an amine comprising at least two primary amino groups, which is different from (B-i.1),
- and optionally with at least one selected from the group consisting of
  - (B-i.3) at least one selected from the group consisting of urea and a urea derivative,
  - (B-i.4) an at least difunctional di- or polyisocyanate, and
  - (B-i.5) a carboxylic acid comprising at least two carboxyl groups or a derivative thereof wherein said derivative is selected from the group consisting of a carboxylic acid halide, a carboxylic acid anhydride, and a carboxylic acid ester,
- to obtain a hydrophobic polymer segment; and
- (B-iii) reacting the hydrophobic polymer segment obtained in (B-i) with a diamine, and at least a portion of the amino groups present in a polymer obtained are converted to at least one selected from the group consisting of a carbobetaine group, a sulfobetaine group, and a phosphobetaine group, and
- wherein the urea, derivative of (B-i.3) is selected from the group consisting of:
  - a substituted urea of the formula $R^1R^2N-C(=O)-NR^3R^4$, wherein $R^1$, $R^2$, $R^3$, and $R^4$ are each independently hydrogen, a $C_1$-$C_{12}$-alkyl, an aryl, or an aryl-$C_1$-$C_4$-alkyl, wherein at least one of the radicals $R^1$, $R^2$, $R^3$, $R^4$, is not hydrogen; or at least one selected from the group consisting of i) $R^1$ and $R^2$ and ii) $R^3$ and $R^4$ are in each case together a $C_2$-$C_5$-alkylene, wherein a methylene group may optionally be replaced by a carbonyl group; or $R^1$ and $R^3$ are together a $C_2$-$C_5$-alkylene, wherein a methylene group may optionally be replaced by a carbonyl group; or at least one selected from the group consisting of i) $R^1$ and $R^2$ and ii) $R^3$ and $R^4$, in each case together with the nitrogen atom to which they are bonded, form a 5- or 6-membered unsaturated aromatic or nonaromatic ring optionally comprising one or two further nitrogen atoms, a sulfur atom, or an oxygen atom as a ring member;
  - biuret;
  - thiourea;
  - a substituted thiourea of formula $R^5R^6N-C(=S)-NR^7R^8$, wherein $R^5$, $R^6$, $R^7$, and $R^8$ are each independently hydrogen, a $C_1$-$C_{12}$-alkyl, an aryl, or an aryl-$C_1$-$C_4$-alkyl, wherein at least one of the radicals $R^5$, $R^6$, $R^7$, and $R^8$ is not hydrogen; or at least one selected from the group consisting of i) $R^5$ and $R^6$ and ii) $R^7$ and $R^8$, in each case together, are a $C_2$-$C_5$-alkylene, wherein a methylene group may optionally be replaced by a carbonyl group; or $R^5$ and $R^7$ are together $C_2$-$C_5$-alkylene, wherein a methylene group may be optionally replaced by a carbonyl group; or at least one selected from the group consisting of i) $R^5$ and $R^6$ and ii) $R^7$ and $R^8$, in each case together with the nitrogen atom to which they are bonded, form a 5- or 6-membered unsaturated aromatic or nonaromatic ring optionally comprising one or two further nitrogen atoms, a sulfur atom, or an oxygen atom as a ring member;
  - guanidine;
  - a substituted guanidine of formula $R^9R^{10}N-C(=NR^{11})-NR^{12}R^{13}$, wherein $R^9$, $R^{10}$, $R^{11}$, $R^{12}$, and $R^{13}$ are each independently hydrogen, a $C_1$-$C_{12}$-alkyl, an aryl, or an aryl-$C_1$-$C_4$-alkyl, wherein at least one of the radicals $R^9$, $R^{10}$, $R^{11}$, $R^{12}$, and $R^{13}$ is not hydrogen; or at least one selected from the group consisting of i) $R^9$ and $R^{10}$ and ii) $R^{12}$ and $R^{13}$, in each caste together, are a $C_2$-$C_5$-alkylene wherein a methylene group may optionally be replaced by a carbonyl group; or $R^9$ and $R^{12}$ together are a $C_3$-$C_5$-alkylene, wherein a methylene group may optionally be replaced by a carbonyl group; or at least one selected from the group consisting of i) $R^9$ and $R^{10}$ and ii) $R^{12}$ and $R^{13}$, in each as together with the nitrogen atom to which they are bonded, form, a 5-, or 6-membered unsaturated aromatic or nonaromatic ring optionally comprising one or two further nitrogen atoms, a sulfur atom, or an oxygen atom as a ring member; and
  - a carbonic acid ester of formula $R^{14}-O-CO-O-R^{15}$, wherein $R^{14}$ and $R^{15}$ are each independently a $C_1$-$C_{12}$-alkyl, an aryl, or an aryl-$C_1$-$C_4$-alkyl or $R^{14}$ and $R^{15}$ together are a $C_2$-$C_5$-alkylene.

* * * * *

UNITED STATES PATENT AND TRADEMARK OFFICE
CERTIFICATE OF CORRECTION

PATENT NO. : 10,077,336 B2
APPLICATION NO. : 13/516426
DATED : September 18, 2018
INVENTOR(S) : Maxim Peretolchin et al.

It is certified that error appears in the above-identified patent and that said Letters Patent is hereby corrected as shown below:

In the Specification

In Column 6, Line 38, delete "oxazoylyl," and insert -- oxazolyl, --, therefor.

In Column 10, Line 9, delete "trioxamidecane-" and insert -- trioxatridecane --.

In Column 11, Line 7, delete "$A^c$," and insert -- $A^C$, --, therefor.

In Column 33, Line 32, delete "of the of the" and insert -- of the --, therefor.

In Column 37, Line 31, delete "Ma" and insert -- $A^{5a}$ --, therefor.

In the Claims

In Column 45, Line 23, Claim 1, delete "Bifunctional" and insert -- difunctional --, therefor.

In Column 46, Line 31, Claim 1, delete "area" and insert -- urea --, therefor;
    Line 37, Claim 1, delete "hydrogen:" and insert -- hydrogen; --, therefor.

In Column 47, Line 7, Claim 1, delete "$C_1$-$C_{12}$-alkyl" and insert -- $C_1$-$C_{12}$-alkyl, --, therefor;
    Line 57, Claim 4, delete "(I.)," and insert -- (I.1), --, therefor.

In Column 48, Line 26, Claim 5, delete "$C_2C_4$-hydroxyalkyl," and insert -- $C_2$-$C_4$-hydroxyalkyl, --, therefor.

In Column 49, Line 49, Claim 13, before "$R^{14}$" insert -- and --;
    Line 60, Claim 13, delete "nonarornatic" and insert -- nonaromatic --, therefor.

In Column 50, Line 17, Claim 21, delete "1,2-propylene diamine:" and insert -- 1,2-propylene diamine; --, therefor.

Signed and Sealed this
Fourteenth Day of January, 2020

Andrei Iancu
*Director of the United States Patent and Trademark Office*

CERTIFICATE OF CORRECTION (continued)
U.S. Pat. No. 10,077,336 B2

<u>In Column 51</u>, Line 24, Claim 25, delete "oxide)" and insert -- oxide --, therefor.

<u>In Column 52</u>, Line approx. 55, Claim 27, delete "(VII)" and insert -- (VII), --, therefor.

<u>In Column 53</u>, Line 30, Claim 30, delete "urea," and insert -- urea --, therefor;
    Line 36, Claim 30, delete "$R_4$," and insert -- and $R_4$ --, therefor.

<u>In Column 54</u>, Line 1, Claim 30, delete "sulftur" and insert -- sulfur --, therefor;
    Line approx. 21, Claim 30, delete "atom." and insert -- atoms, --, therefor;
    Line 27, Claim 30, delete "$R^{13}$is" and insert -- $R^{13}$ is --, therefor;
    Line 30, Claim 30, delete "caste" and insert -- case --, therefor;
    Line 36, Claim 30, delete "as" and insert -- case --, therefor;
    Line 37, Claim 30, delete "form, a 5-," and insert -- form a 5- --, therefor;
    Line approx. 44, Claim 30, delete "and$R^{15}$" and insert -- and $R^{15}$ --, therefor.